United States Patent
Ebert et al.

(10) Patent No.: US 11,554,308 B2
(45) Date of Patent: Jan. 17, 2023

(54) SYSTEM OF AND METHOD FOR SCORING GOLF

(71) Applicant: Par Points Golf, LLC, Salina, KS (US)

(72) Inventors: Brandon Ebert, Salina, KS (US); Kevin Quinley, Salina, KS (US); Ryan Hannebaum, Prairie Village, KS (US)

(73) Assignee: PAR POINTS GOLF, LLC, Salina, KS (US)

( * ) Notice: Subject to any disclaimer, the term of this patent is extended or adjusted under 35 U.S.C. 154(b) by 0 days.

(21) Appl. No.: 17/077,799

(22) Filed: Oct. 22, 2020

(65) Prior Publication Data

US 2021/0113912 A1  Apr. 22, 2021

Related U.S. Application Data

(60) Provisional application No. 62/924,500, filed on Oct. 22, 2019.

(51) Int. Cl.
  *A63B 71/06*  (2006.01)
  *A63B 102/32*  (2015.01)

(52) U.S. Cl.
  CPC ...... *A63B 71/0669* (2013.01); *A63B 71/0622* (2013.01); *A63B 2071/0694* (2013.01); *A63B 2102/32* (2015.10)

(58) Field of Classification Search
  CPC .................................................. A63B 71/0669
  USPC .......................................................... 700/92
  See application file for complete search history.

(56) References Cited

U.S. PATENT DOCUMENTS

| | | | | |
|---|---|---|---|---|
| 5,214,679 A | * | 5/1993 | Metcalf | G01C 22/004 377/5 |
| 5,319,548 A | * | 6/1994 | Germain | A63B 71/06 273/DIG. 26 |
| 5,653,642 A | * | 8/1997 | Bonacorsi | A63B 24/0021 473/153 |

(Continued)

FOREIGN PATENT DOCUMENTS

| | | | | |
|---|---|---|---|---|
| GB | 2101489 A | * | 1/1983 | ......... A63B 71/0672 |
| KR | 100804998 B1 | | 2/2008 | |

(Continued)

OTHER PUBLICATIONS

"International Search Report and Written Opinion for International Application No. PCT/US2020/056888, Search completed Feb. 9, 2021, dated Feb. 9, 2021".

*Primary Examiner* — Alvin A Hunter
(74) *Attorney, Agent, or Firm* — Kutak Rock LLP; Brian L. Main

(57) ABSTRACT

A system for and method of scoring a game of golf is provided. A stroke baseline, a points baseline, and a stroke count are utilized to calculate a hole score for each hole. The stroke baseline is typically derived from the par value for a hole, while the stroke count is typically the total strokes required to complete the hole, including any penalty strokes. Typically, the points baseline for each hole is equal to the distance, in yards, between the player's tee-up location and a target location of the hole, the target location being a location on the putting green. Each player selects a tee-up location for each hole, thereby allowing each player to influence the baseline score for each hole. A performance factor is determined for each hole based on the player's performance on that hole.

7 Claims, 18 Drawing Sheets

(56) References Cited

U.S. PATENT DOCUMENTS

| | | | | |
|---|---|---|---|---|
| 5,949,679 | A | * | 9/1999 | Born ................ A63B 71/0669 |
| | | | | 700/91 |
| RE36,346 | E | * | 10/1999 | Germain ................ A63B 71/06 |
| | | | | 473/407 |
| 6,321,128 | B1 | * | 11/2001 | Costin, IV ............. A63B 69/36 |
| | | | | 473/131 |
| 6,571,143 | B1 | * | 5/2003 | Mallamo ............ A63B 24/0084 |
| | | | | 700/92 |
| 2015/0032237 | A1 | | 1/2015 | Roebke |
| 2015/0335978 | A1 | | 11/2015 | Syed et al. |

FOREIGN PATENT DOCUMENTS

| | | | | |
|---|---|---|---|---|
| KR | 1020130047079 A | | 5/2013 | |
| KR | 1020190096572 A | | 8/2019 | |
| WO | WO-9702873 A1 | * | 1/1997 | ............. A63B 71/06 |
| WO | WO-2010038045 A2 | * | 4/2010 | ......... A63B 71/0669 |

* cited by examiner

SYSTEM OF AND METHOD FOR SCORING GOLF

CROSS-REFERENCE TO RELATED APPLICATIONS

This application claims priority pursuant to 35 U.S.C. 119(e) to U.S. Provisional Patent Application Ser. No. 62/924,500, filed Oct. 22, 2019, the entire disclosure of which is incorporated herein by reference.

FIELD OF THE INVENTION

The present invention relates generally to recreational games. More specifically, the present invention is concerned with a novel system and method for playing and scoring recreational games, particularly golf.

BACKGROUND

Golf is a club-and-ball sport in which players utilize various clubs to advance balls along a series of holes on a course. The object of the game is to advance a ball, in as few strokes as possible, from a designated starting point of a hole (a "tee box") to a designated ending point of the hole (a "cup"), which is positioned on a putting green. A fairway extending between the tee box and the putting green is generally configured to facilitate advancement of the ball while hazards are generally configured to hinder such advancement. Golf, unlike most ball games, cannot and does not utilize a standardized playing area, and coping with hazards and varied terrains encountered on different courses is a key part of the game.

A traditional game ("round") of golf is played on a course with an arranged progression of 18 holes, the completion of which often taking about three or four hours experienced golfers, but even longer for novice golfers. Unfortunately, it can be difficult or impossible to carve out sufficient time to complete a round of golf, especially for less novice golfers. Accordingly, it would be beneficial to have a system for and a method of shortening the amount of time it takes to play a round of golf.

Regulation golf courses are typically divided into two groups of nine holes, commonly referred to as the front nine and the back nine, while some recreational courses can be smaller, often having just nine holes. Rather than playing a full round, golfers can elect to play part of a regulation course (the front nine or the back nine) or they can play a smaller recreational course. Unfortunately, even nine holes can take two or more hours to complete. Accordingly, it would be beneficial to have a system for and a method of shortening the amount of time it takes to play a partial round of golf.

Each hole is given a par value, which is equal to the number of strokes a skilled golfer is expected to need to complete play of the hole. The primary factor for calculating the par value of a relatively straight, hazard-free hole is the distance from the tee box to the putting green, with the par value being equal to the number of strokes a skilled golfer is expected to require to reach the green plus two additional strokes to advance the ball along the putting green into the cup. As such, the minimum par value of any hole is three; one stroke for a tee shot and two strokes for putting. Par values of 3, 4, and 5 are common; far more rarely, courses may feature holes having par values of six or more. Courses are also assigned a par value, the par value of a course being equal to the sum of the par value for each hole of the course.

The goal is to complete a round using as few strokes as possible, but preferably not more strokes than the par value for the course. Some courses will display names of players with the lowest scores for the course, thereby recognizing the players with the lowest score while motivating other players to match or beat the low score. Unfortunately, very few players have a chance of matching (or even coming close to) a low score on a golf course. Accordingly, it would be beneficial to have a different scoring and recognition system so that more players can be recognized and motivated.

A golfer's number of strokes for a hole, a round, or a tournament (which may include several rounds) is compared to the respective par value for the hole, round, or tournament, and is then reported either as the number that the golfer was "under-par" or "over-par", or as "even" if it is equal to the par value. Common scores for a hole also have specific terms that have been attributed to them: −4, Condor (four strokes under par); −3, Albatross (or Double Eagle, three strokes under par); −2, Eagle (two strokes under par); −1; Birdie (one stroke under par); E, Par (equal to par); +1, Bogey (one stroke over par); +2, Double bogey (two strokes over par); +3, Triple bogey (three strokes over par). Another common term is "snowman" (typically eight strokes), which is a point during a hole where many golfers feel obligated or otherwise compelled to pick up their ball and move to the next hole. Unfortunately, failure to complete a hole can reduce confidence, increase frustration, and hinder the golfer's ability to improve. Accordingly, it would be beneficial to have a system for and a method of increasing the chances that player will complete each hole on a course, thereby increasing confidence, decreasing frustration, and improving the player's abilities.

As with most sports, the best way to improve confidence and abilities is to practice. While driving ranges and putting greens provide opportunities to practice driving and putting, respectively, each is limited in its ability to improve a golfer's game. Instead, many aspects of a golf game, such as club selection and other strategic decisions, are best learned and perfected on a golf course. Unfortunately, few courses, if any, are designed with training in mind, making it difficult for golfers, especially novice golfers, to get the type of repetitive training required to improve their skills and confidence. Accordingly, it would be beneficial to have a system for and a method of facilitating training on any golf course.

Executive golf courses, which include par three holes as the primary or exclusive hole length, have become fairly popular with novice golfers and busy golfers alike. Unfortunately, there are only a limited number of executive golf courses, and novice golfers may grow weary of playing the same executive golf courses. Furthermore, a high number of novice golfers at an executive golf course tend to slow pace of play for more experienced golfers who may have a limited amount of time to play a round, thereby potentially frustrating the purpose for going to an executive course. Accordingly, it would be beneficial to have a system for and a method of making standard golf courses more accessible to novice golfers. It would be even more beneficial to have a system for and a method of facilitating play by novice golfers so as to minimize or eliminate delays to other golfers, regardless of which course the novice golfer elects to play.

As with any game, competition is a key aspect of golf. There are, traditionally, two basic forms of golf play, match play and stroke play. Stroke play is more commonly utilized. In stroke play, the number of strokes required for all holes of the round or tournament are added to determine a total score, and the player with the lowest total score wins. In match play, the number of strokes required for each hole are compared between two players (or two teams), with the lower score winning a point for that hole. If the scores are equal, the hole is "halved". Unlike stroke play, match play is won by the party with the highest score (most holes won or halved). Unfortunately, these scoring systems leave very little flexibility for golfers to influence their possible scores, often preventing or otherwise limiting a player's ability to utilize strategy. Accordingly, it would be beneficial to have a system for and a method of allowing golfers to have more influence over their possible scores, thereby enabling golfers to utilize different strategies in different situations.

In addition to traditional stroke and match playing systems, other scoring systems have been utilized, each having its own limitations.

A bogey or par competition is a scoring format sometimes seen in informal tournaments. Its scoring is similar to match play, except each player compares their hole score to the hole's par rating instead of the score of another player. The player "wins" the hole if they score a birdie or better, they "lose" the hole if they score a bogey or worse, and they "halve" the hole by scoring par. Despite being a unique scoring system, a player's score is still dictated by the player's performance while providing little to no opportunity for an individual player to utilize strategy to further influence their score.

The Stableford system is a simplification of stroke play that awards players points based on their score relative to the hole's par; the score for a hole is calculated by taking the par score, adding 2, then subtracting the player's hole score, making the result zero if negative. Alternately stated, a double bogey or worse is zero points, a bogey is worth one point, par is two, a birdie three, an eagle four, and so on. The US Golf Association sanctions a "Modified Stableford" system for scratch players, which makes par worth zero, a birdie worth 2, eagle 5, and double-eagle 8, while a bogey is a penalty of −1 and a double-bogey or worse −3. Once again, such a system provides little to no opportunity for an individual player to utilize strategy to further influence their score.

Foursomes, also known as Alternate Shot, are played in pairs, in which each team has only one ball and players alternate playing it. For example, if players "A" and "B" form a team, "A" tees off on the first hole, "B" will play the second shot, "A" the third, and so on until the hole is finished. On the second hole, "B" will tee off (regardless of who played the last putt on the first hole), then "A" plays the second shot, and so on. Foursomes can be played as match play or stroke play. Once again, such a system provides little to no opportunity for an individual player to utilize strategy to further influence their score.

A scramble, also known as ambrose or best-shot, is where each player in a team tees off on each hole, and the players decide which shot was best. Every player then plays their second shot from within a club length of where the best shot has come to rest (and no closer to the hole), and the procedure is repeated until the hole is finished. This system is very common at informal tournaments such as for charity. While some team strategy is required when determining the "best shot" each time (some shots may be closer to the putting green but another shot may have a better approach), the extent to which such decisions can influence the team's score is very limited.

Handicapping provides the best opportunity for a golfer to influence their ability to win a tournament, but not in a good way. Handicaps have been introduced as a way to facilitate competition between golfers of varied skill levels. A handicap is a numerical measure of a golfer's potential scoring ability over 18 holes. Better players are those with the lowest handicaps, and someone with a handicap of 0 or less is often referred to as a scratch golfer. Handicap systems vary throughout the world and use different methods to assess courses and calculate handicaps.

Golf courses are assessed and rated according to the average good score of a scratch golfer, taking into account a multitude of factors affecting play, such as length, obstacles, undulations, etc. A player's handicap gives an indication of the number of strokes above this course rating that the player will make over the course of an "average best" round of golf, i.e. scoring near their potential, above average. Lower handicap players are generally the most consistent, so can be expected to play to this standard or better more often than higher handicappers. Some handicap systems also account for differences in scoring difficulty between low and high handicap golfers. They do this by means of assessing and rating courses according to the average good score of a "bogey golfer", a player with a handicap of around 20. This is used with the course rating to calculate a slope rating, which is used to adjust golfer's handicap to produce a playing handicap for the course and set of tees being used.

Unfortunately, handicap systems have potential for abuse by players who may intentionally play poorly (such as by routinely taking unnecessary and ill-advised risks), thereby intentionally or unintentionally increasing their handicap (sandbagging) before playing to their potential at an important event with a valuable prize. For this reason, handicaps are not used in professional golf, but they can still be calculated and used along with other criteria to determine the relative strengths of various professional players. Touring professionals, being the best of the best, have negative handicaps; and can be expected, more often than not, to score lower than the Course Rating on any course.

The existing scoring and handicapping methods present a variety of problems that have long plagued the world of golf. One such problem is that it is difficult for players of varied skill to compete with each other and some formats, such as best ball, effectively eliminate contributions from lessor skilled players. Attempts have been made to adjust for lower skilled players via handicaps, but these are after-the-fact adjustments and do not impact the experience of playing the round as it is happening. Accordingly, it would be advantageous to have a scoring system and method that allows for players of all skill levels to compete together without eliminating or otherwise minimizing contributions from lower skilled players. It would be further beneficial to provide a meaningful change to how a round of golf is played and scored so that all players are involved and competitive.

Moreover, none of the existing scoring systems adequately address pace of play issues. Instead, some scoring systems actually worsen pace of play issues. Accordingly, it would be advantageous to have a system for and method of scoring that allows players to adjust a given hole to their skill level, allowing them to complete the hole in approximately the same amount of time a player of higher skill would complete it in, thereby eliminating or otherwise minimizing pace of play issues. Additionally, it would be advantageous to have a system for and method of scoring that encourages players to move to the next hole once a certain number of strokes have been undertaken, but preferably while still providing each player with a legitimate opportunity to complete each hole.

The current methods of scoring also can result in immense dissatisfaction with poor performance and a need to undergo significant training prior to playing a full round of golf. New players oftentimes struggle to make par on any hole in a full round and can oftentimes take over 100 strokes to complete a 72 stroke par course. This leaves new players dissatisfied and embarrassed and unlikely to play more often or to play in groups, thereby limiting enjoyment and opportunities to improve. Moreover, courses are oftentimes too difficult for beginners and there is a significant barrier of entry into the game. It would be advantageous to have a system for and a method of scoring that allows beginners to play on their local courses without generating embarrassingly high scores relative to par. It would also be advantageous to have a system for and method of scoring that allows for higher skilled golfers to compete with lower skilled gofers against an achievable target for both levels of players, as this encourages comradery while also encouraging the lower skilled players to participate in the sport more often, leading to more rapidly developed skills and higher engagement.

Moreover, current methods of scoring do nothing to address the monotony of playing the same course multiple times. Golfers typically play the courses that are geographically near to them and eventually develop familiarity with the courses. Unfortunately, the courses can become stale due to this familiarity and golfers constantly desire new challenges that. Accordingly, it would be advantageous to have a system for and method of scoring that allows a given course to be played from a new perspective while adding in new strategic considerations associated with a given hole on the course, such as how to play certain hazards on the course.

Some initiatives have attempted to address pace of play and barrier issues with limited success. The Tee-It-Forward initiative encouraged golfers of lower skill to tee their ball up further on the course. However, this initiate failed to address the fundamental scoring mechanisms associated with disparities in starting positions, thereby providing a limited ability for players of varied skills to compete against each other. For instance, those who played further forward received no penalty for the move, making the decision less about strategy and more about an acknowledgement of their low skill level. Moreover, those who played further back did not receive any incentive for doing so, making it difficult for them to respect the other player's decision to play it forward. In other words, because the Tee-It-Forward initiative failed to provide additional strategic considerations, it could not overcome the stigma associated with playing forward.

Operation 36 is another initiative to address players of lower skill. This initiative proposes that golfers start by playing holes from a set distance away, such as 25 yards, and move back once they can shoot par from that distance. However, this initiative is mainly geared toward kids and youth golfers and provides no mechanism for golfers of different skill levels to compete against each other. The initiative serves as a training or introductory program only and does nothing to address the limitations of existing scoring methods.

Regardless of whether a golfer is competing against other golfers, they are almost always competing against themselves. For instance, golfers like to see improvement in their game, such as by improving (lowering in traditional golf scoring systems) their best score for a course. Unfortunately, traditional scoring systems provide few opportunities for a golfer to improve their score. Accordingly, it would be beneficial to provide a system for and method of providing more opportunities for golfers to improve their scores.

Regardless of whether a golfer is competing against other golfers or themselves, they are almost always competing against a course. For instance, a golfer essentially competes against each hole by trying to hit par or better each time, and against each course in the same way. Using traditional scoring systems, teeing off from the designated tee box is critical to ensure the credibility of the golfer's score. Accordingly, it would be advantageous to have a system for and method of scoring that does not require golfers to tee off from a designated tee box, such as by adding strategic considerations to playing from in front of the tee box.

SUMMARY

The present invention comprises a system for and a method of playing and scoring a game of golf. For instance, rather than merely counting the number of strokes necessary to complete a hole or a round, the present invention calculates a point total based on the golfer's performance. In some embodiments, a point total for a hole is determined based on a location of a golfer's tee shot relative to a location of a putting green or cup of the hole.

The present invention enables golfers to reduce the amount of time it takes to play a round of golf, thereby making it easier for golfers to fit a full (or partial) round of golf into their busy schedules. For instance, the present invention facilitates reducing the amount of time required to complete each hole, such as by allowing golfers to select a tee location that works best for them rather than requiring them to tee off from a designated tee location. Because such elections are accounted for in the scoring system, the golfer is able to shorten (or lengthen) the amount of time necessary to play each hole while still maintaining the integrity of the game.

The present invention provides increased opportunities for players to be recognized for their accomplishments. For instance, the present invention provides opportunities for players with varied strengths and weaknesses to more frequently play to their strengths, thereby giving them more opportunities to perform well. In one example, a player with a poor long game but a good short game can play forward on longer holes (such as par 4's and par 5's). In this way, the present invention allows a variety of players to be recognized, and not just the traditionally elite players. In another example, scores can be compared to smaller groups of other players, such as a group of friends, classmates, co-workers, or the like, thereby increasing the chances that any one of such group being recognized as having a high score of the group. In some embodiments, the system enables a player to be included in a plurality of groups, thereby further increasing the opportunity for such player to be recognized one or more times.

The present invention provides increased opportunities for players to complete each hole on a course. For instance, a new player or a player who has a poor long game can play forward on at least some of the longer holes, thereby assisting the player in becoming more experienced and more confident at playing such holes. By avoiding at least some overly difficult situations (at least until such player is ready for such situations), players are less likely to become frustrated with golf, and are more likely to grow in confidence and ability, which also tends to result in increased enjoyment of the game.

The present invention provides a superior method of training golfers by allowing players to incremental increase difficulty of a hole and/or a course as their skills improve.

The present invention also assists players in determining their progress and identifying areas where further training may be required.

The present invention provides a superior golf experience for all golfers by making it easier for golfers of any level to play on virtually any golf course while simultaneously reducing the risk that a lower-level golfer will hinder play of a more experienced golfer.

The present invention provides increased opportunities for golfers to develop and implement new strategies for playing a round of golf, such as by locating a ball in front of or behind a tee box for each hole. By enabling golfers to select personalized tee locations for each hole, a player can essentially adjust the difficulty level of a course to satisfy the player's particular needs or desires.

The present invention provides countless opportunities for players to improve their personal best scores. In some embodiments, the present invention utilizes a points baseline that is proportionally related (such as by being equal to) a distance in yards from a starting point (location of the tee shot) to an ending point (location of the cup or putting green). For example, a first golfer who elects to tee up 150 yards away from the cup (or putting green) will have a points baseline of 150 points while a second golfer who elects to tee up 300 yards away from the cup (or putting green) will have a points baseline of 300 points. Accordingly, players have the opportunity on each hole to improve their personal best score for that hole simply by starting an additional yard further back each time.

In some embodiments, the present invention utilizes a performance factor, such as a multiplier that is determined based upon the total number of strokes required to complete the whole when compared against a stroke baseline (par value or the like) for the hole. In some embodiments, the performance factor is equal to 1 if the player matches the stroke baseline (i.e. par) and increased by 1 for each stroke under the stroke baseline (i.e. birdie, eagle, etc.). Accordingly, the present invention further provides golfers an opportunity to improve their score on a particular hole by stepping further forward so as to increase the likelihood that they can complete the hole with less strokes. In some embodiments, the performance factor is linear while in other embodiments the performance factor is non-linear. In some embodiments, exceeding the stroke baseline (i.e. bogie, double bogie, or the like) results in a performance factor of less than 1, such as a fractional performance factor or even a negative performance factor. In this way, the present invention provides even more flexibility to increase or decrease challenge levels for a particular hole or round of golf. In some embodiments a zero factor is utilized when the number of strokes exceeds a certain threshold, such as the stroke baseline for the hole. In this case, the player is encouraged to simply pick up their ball and move to the next hole.

The scoring systems and methods of the present invention prove advantageous over the prior art for a multitude of reasons. For instance, the present invention allows for players of disproportionate skill to complete the same course presented in the same layout at the same time while both players are aiming to shoot par. Furthermore, the present invention eliminates the slow pace of play issues inherent in existing efforts to allow players of disparate skill to play together by allowing the players to adjust the course to their skill level and, when necessary or desired, by providing reduced or no benefit to continuing to play beyond exceeding the par for a particular hole. More importantly, however, the present invention incentivizes lower-skilled golfers to play forward, thereby foregoing strokes at the beginning of the hole rather than at the end of the hole. In this way, golfers coming up behind the less experienced golfer will be less likely to have to wait for the less-experienced golfer to get out of the way before they can take their tee shots. The present invention also increases the efficiency of the course itself, as the average time on the course is lowered and throughput is increased.

The present invention also introduces new strategic considerations regarding risk and reward. A player who starts further back can establish a higher Points Baseline, but may decrease their chances of completing the course in a certain number of strokes. Alternatively, playing closer is a safer option, but it limits the potential reward.

The present invention also refreshes oft-played courses and introduces new variances to every round. Under old scoring methods, golfers replaying a course will play from the same pre-set tee boxes and encounter roughly the same selection of shots as previously presented with. The scoring system and method herein introduces variance into each round as a player is encouraged to consider every angle on a hole from every possible shooting location. The player is also encouraged to learn how their skills best fit a given hole from all possible shooting locations to maximize their total points reward while minimizing risk. This makes every hole play differently depending on the risk/reward tradeoff the player wants to utilize.

The present invention also serves to advance player skill by tracking their progress relative to their skill in a numerical manner that is correlated to a starting position. Instead of focusing on simply playing closer to get to par, the player gets a representation of their score, which accounts both for the golfer's performance (how well they scored against par) and the relative difficulty of the hole (i.e. starting location). This allows players to see smaller increases in skill, such as improvements for particular shots shown in a numerical manner, instead of simply comparing their overall score relative to par.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION

A preferred embodiment of the invention, illustrative of the best mode in which the applicant has contemplated applying the principles, is set forth in the following description and is shown in the drawings and is particularly and distinctly pointed out and set forth in the appended claims.

FIG. 12 is a screenshot depicting a list of options for a user to choose from.

Figure 1:
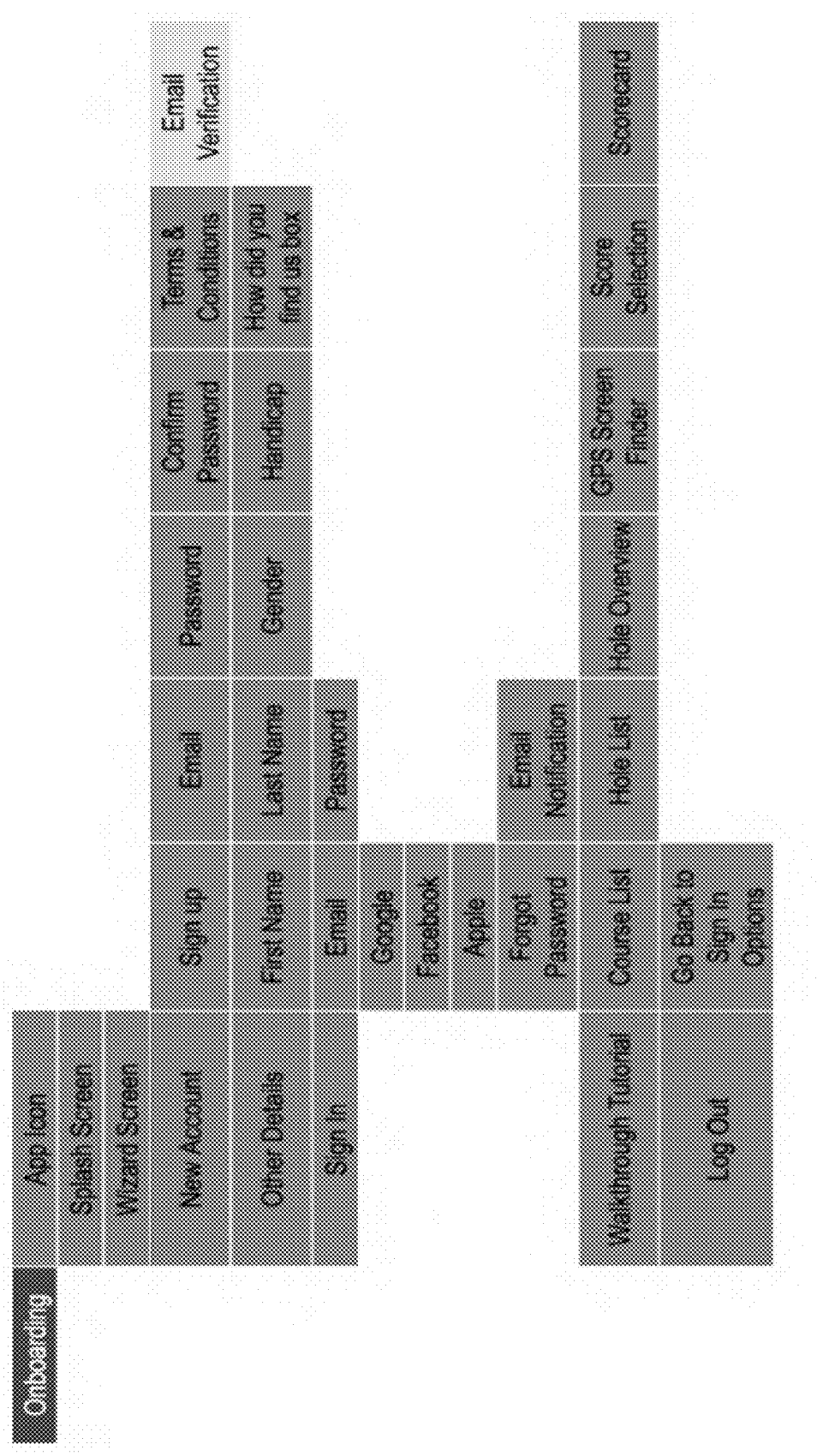
FIG. 1 is a diagram depicting a workflow for an onboarding routine.

Exhibit A includes diagrams and screenshots associated with various embodiments of the present invention.

DETAILED DESCRIPTION

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a baseline for the claims and as a representative baseline for teaching one skilled in the art to variously employ the present invention in virtually any appropriately detailed structure.

The present invention includes a system of a method for scoring a game of golf. As with traditional golf scoring methods, each hole is assigned a value associated with an expected number of strokes required to complete the hole (the "Stroke Baseline") and each player is awarded a score for each hole (the "Hole Score"). Unlike traditional golf scoring methods, however, the Hole Score is determined by more than just the number of strokes required to complete the hole (the "Stroke Count"). Instead, the Hole Score is determined by the difficulty of the hole, which is represented by a baseline point value (the "Points Baseline"), and the player's performance completing the hole, which is represented by a number that is used to adjust the Points Baseline (the "Performance Factor").

In some embodiments, the Stroke Baseline is a standard number of strokes it is anticipated that the player will take to complete the hole. In some embodiments, the Stroke Baseline is equal to the standard par value for a given hole. For example, a par 4 is given a Stroke Baseline of 4. In some embodiments, the Stroke Baseline is derived from the standard par, such that the Stroke Baseline is calculable starting from the standard par for a hole. In some embodiments, the Stroke Baseline is calculated by adding to or subtracting from the standard par a predetermined value. For example, the predetermined value may be +1, giving a par 4 a Stroke Baseline of 5 (4+1). In some embodiments, the Stroke Baseline is predetermined for a given hole of golf and is independent of the standard par for the hole.

The Stroke Count is determined by counting the number of strokes required to complete a hole, with no regard to where the first stroke occurred. For instance, a first player can play a first stroke of a first hole from a designated tee box of the first hole and then play a first stroke of a second hole outside of the tee box of the second hole, such as in an area positioned in front of the tee box. Similarly, a second player can elect to play respective first strokes of the first and second holes from the first and second tee boxes or outside of the first and/or second tee boxes, regardless of where the first player plays their first strokes from. In some embodiments, the present invention recognizes a plurality of areas associated with the hole as potential starting points, regardless of the distance of each area from the designated tee box. Regardless of where the player is located when the first stroke is undertaken, the Stroke Count accounts for all strokes required to complete the hole. Accordingly, the Stroke Count represents the players performance for a given hole.

The Points Baseline represents the difficulty level of a hole and is determined completely independent of the player's past or present performance. Unlike par values of traditional scoring systems, the present invention enables players to influence the Points Baseline for each hole. In some embodiments, the Points Baseline for a hole is related to the location where a player elected to play the first stroke (the "Tee-up Location" for that hole). In some embodiments, the Points Baseline is related to the distance from the Tee-up Location to the cup or other location on the putting green (the "Target Location"). In some embodiments, the Target Location is the center of the putting green while in other embodiments the Target Location is a location of the putting green that is closest to the Tee-up Location. In some embodiments, the Points Baseline is equal to the total number of yards between the Tee-up Location and the Target Location. For example, a player who takes their first stroke from 150 yards out will establish a Points Baseline of 150 points. In some embodiments, the Points Baseline accounts for hazards, such as sand traps, water traps, trees, and the like, and/or terrain features, such as elevation changes, dog legs, and the like.

In some embodiments, a Performance Factor is calculated based on a player's performance on a particular hole. In some embodiments, the Performance Factor is determined by comparing a Stroke Count to a Stroke Baseline upon completion of a given hole. In some embodiments, the Performance Factor is equal to 1 when the Stroke Count equal the Stroke Baseline. In some embodiments, the Performance Factor is increased by a set amount, such as one, for each stroke the Stroke Count is less than the Stroke Baseline. For example, in some such embodiments, a Performance Factor of 2 is awarded to any player who takes 3 strokes to complete a hole having a Stroke Base line of 4, but a Performance Factor of 3 is awarded to each player who takes 2 strokes to complete the same hole, regardless of the Tee-up Location for each player. It will be appreciated that the increase in the Performance Factor does not have to be by single integers, nor does the increase have to be linear. In some embodiments, it will be appreciated that as a general rule, as the needed Stroke Count decreases for a given hole, the Performance Factor increases. In some embodiments, Performance Factor has a minimum value of 0. In some embodiments, a Performance Factor of 0 is awarded when the Stroke Count required to complete a given hole surpasses the Stroke Baseline.

The Hole Score represents the total points a player earns for a given hole based on the difficulty of the hole and the performance of the player. In some embodiments, the equation for determining the Hole Score is: Hole Score=(Performance Factor)×(Points Baseline). In some such embodiments, the equation for determining the Performance Factor is: Performance Factor=(1+(Stroke Baseline−Stroke Count)). In some embodiments, a player cannot score less than 0 points for a given hole, while in other embodiments negative scores are possible.

In some embodiments, the present invention includes a system for obtaining and inputting information associated with a particular hole. In some embodiments, the information includes the par value of and/or a Stroke Baseline for the hole. In some embodiments, the present system enables a user to select a Tee-up Location for the hole, thereby establishing a Points Baseline for the hole. In some embodiments, the Points Baseline is automatically calculated upon the player establishing the Tee-up Location for the hole. In some embodiments, a player utilizes a desired Points Baseline to determine one or more potentially desirable Tee-up Locations. In some embodiments, Tee-up Locations are established in a particular order, such as through a random draw, granting honor (lowest score from prior hole tees off first), lowest (or highest) composite score to that point in the round, or the like. In some embodiments, establishment of a Tee-up Location by a first player establishes or otherwise influences the potential Tee-up Locations for a second player. For instance, in some embodiments, a first player establishing their Tee-up Location at a first location requires a second player to establish their same location and/or at a location positioned forward of the first location, depending on the rules selected for a particular game, thereby preventing users from slowing down pace of play by moving back and forth along the length of the course. In some embodiments, order of play within a group is determined based on relative locations of each player's Tee-up Location, with furthest back hitting first, thereby maintaining relatively consistent movement forward while playing the hole.

In some embodiments, the system of the present invention provides each player in a group of players with information pertaining to the performance of each of the other players in the group, such as current composite score, current score capability, anticipated score based on the player's prior scores, and the like. In some embodiments, the system withholds from each player information pertaining to the other player's scoring potential for a hole (i.e. the Points Baseline for each player) until each player establishes an initial Tee-up Location for the hole. In some embodiments, the system is configured to prevent or otherwise inhibit adjustments to initial Tee-up Locations, thereby preventing or otherwise inhibiting adjustments to each player's Points Baseline. In other embodiments, a Tee-up Location of any player playing a hole can be changed up until that player hits their own tee shot. In still other embodiments, a first player hitting a tee shot at a first hole locks in the Tee-up Location for every other player currently playing that hole, thereby preventing subsequent players from making slight adjustments to their Points Baseline (i.e. moving back a few steps) upon an earlier player locking in their Points Baseline.

The present invention further includes a method of scoring a game of golf. In some embodiments, the player hits a first shot from a Tee-up Location, which is established by the player. A Points Baseline for the hole is determined based on the position of the Tee-up Location relative to a Target Location, the Target Location being positioned on a putting green of the hole (i.e. edge of the putting green, center of the putting green, cup located on the putting green, or the like). The player counts the number of hits required to complete the hole, preferably ending with the ball in the cup, thereby establishing a Stroke Count for the hole.

In some embodiments, the method further includes determining a Performance Factor. In some embodiments, the determination is made automatically, while in other embodiments the determination is made manually by the player. In yet other embodiments, the player is presented with a list of possible options for a Performance Factor, and the player selects the correct option based on their performance on the hole. In some embodiments, the player selects the correct option by selecting an option associated with their Stroke Count for the hole.

In some embodiments, the method further includes determining a Hole Score. In some embodiments, the Hole Score is calculated by multiplying the Points Baseline by the Performance Factor. In some embodiments, the calculation is done automatically, while in other embodiments the calculation is performed manually. In some embodiments, the player selects a correct score from a list of options based on their performance on the hole. In some embodiments, the player selects the correct option by selecting an option associated with their Stroke Count for the hole.

Some embodiments of the present invention include a system to assist with scoring a game of golf. In some embodiments, the system includes a device, such as a device comprising a memory coupled to a processor, the memory storing machine readable code to cause the processor to perform certain functions and steps. In some embodiments, the device includes, but is not limited to, one or more additional elements, such as a screen, a camera, touch input sensors, global positioning system (GPS) capabilities, accelerometer data, and the like.

In some embodiments, the device is a smartphone. In some embodiments, the machine-readable code is software that has been installed on the smartphone, such as by installing an application ("app") or the like. In some embodiments, the device or the software (or both) include or generate at least one database for storing information. In some embodiments, a remote server includes at least one database. In some embodiments, the device is connected over a data connection to the remote server such that the device can access at least one database and selectively read and write data to and from the database.

In some embodiments, the software includes an onboarding process, such as an onboarding process that allows the software or at least one database, or both, to track the progress and data associated with a user. In some embodiments, a user is associated with a user profile. In some embodiments, the onboarding process includes checking if a user has a user profile. If the user does have a user profile, the onboarding process is bypassed. However, where a user does not have an existing profile, an onboarding routine is initiated. In some embodiments, the onboarding routine includes having a user create an account. In some embodiments, the account creation process includes intaking information from the user, such as an email address, password, name, gender, handicap, and the like. In some embodiments, this information is stored in a database.

Referring to FIGS. 2-15, some embodiments of the onboarding routine include a tutorial or walkthrough on how to use the software or how to score a hole of golf, or both. In some embodiments, a user interacts with the running software, which guides the user through scoring the game of golf. In some embodiments, the walkthrough displays images and screens that are utilized by the user to score a hole of golf and an entire round of golf. In some embodiments, the walkthrough is similar to screens and functionality which will be utilized by the user. It will be appreciated that functionality shown or described in the walkthrough is present in the full system when utilized outside of the onboarding routine.

Figure 2:
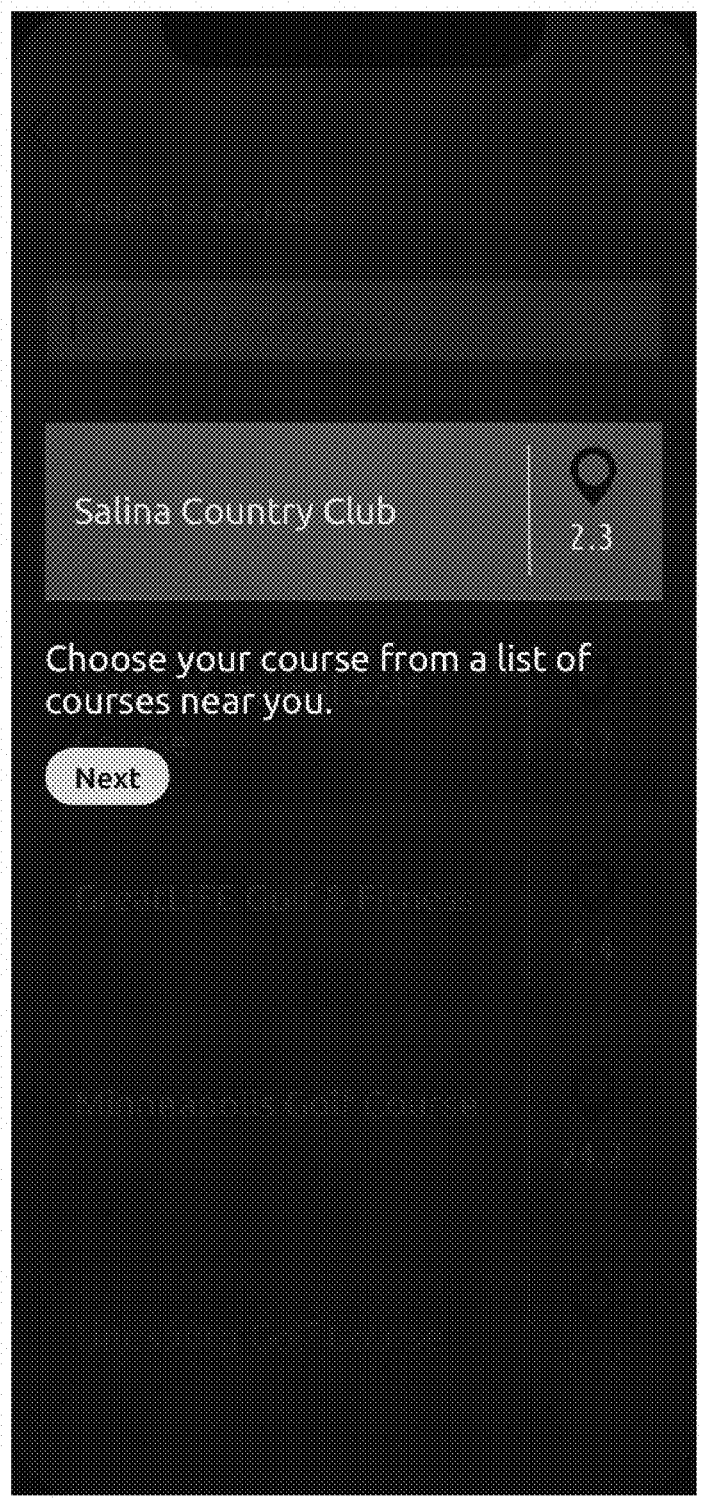
FIG. 2 is a screenshot depicting a course selection screen.
Figure 3:
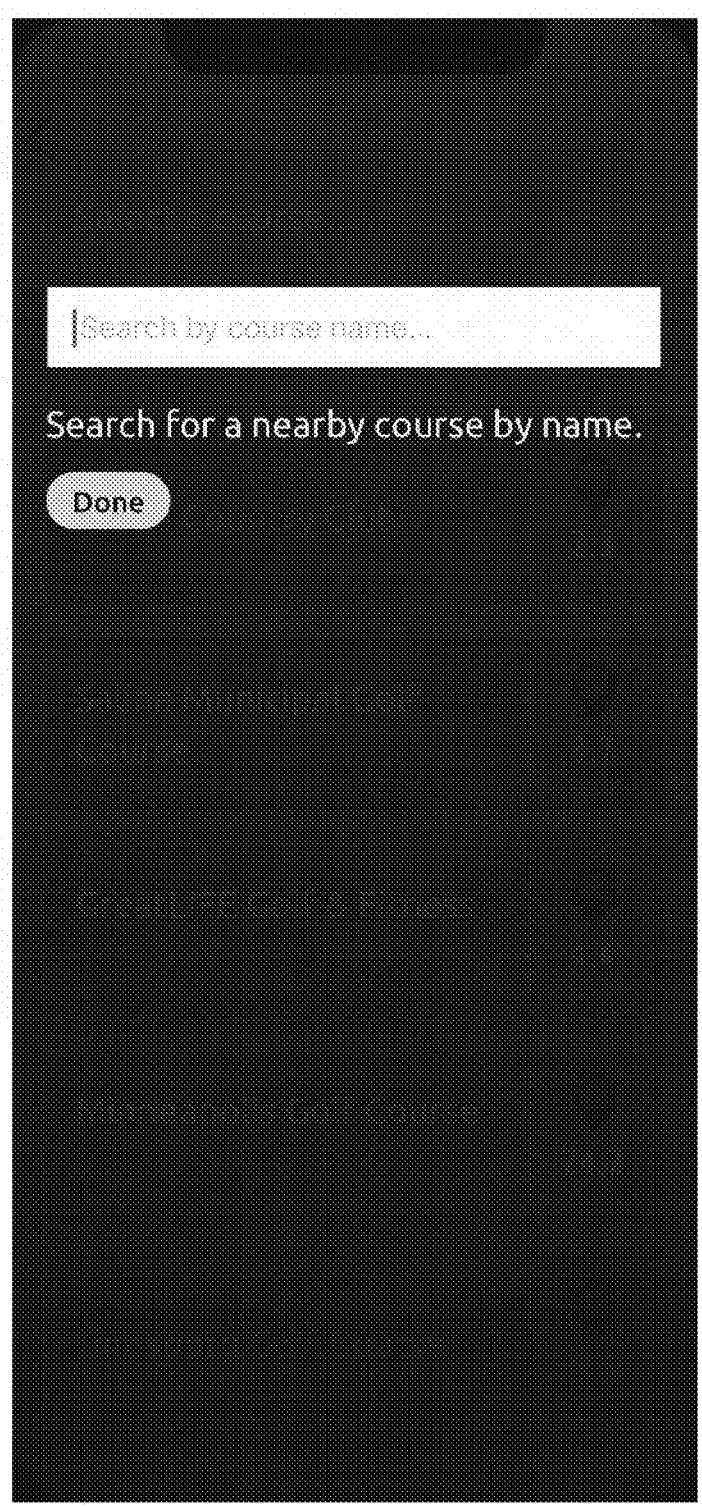
FIG. 3 is a screenshot depicting a course selection screen.
Figure 4:
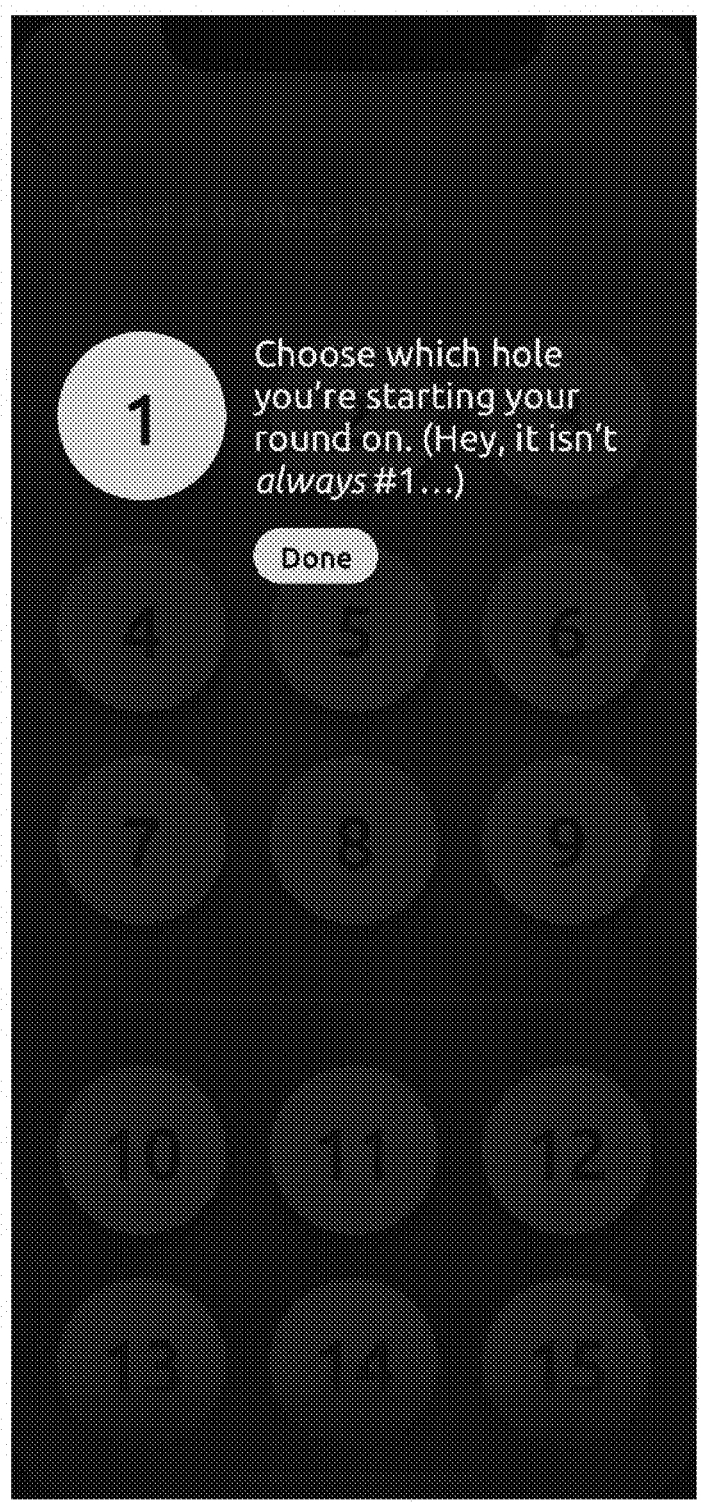
FIG. 4 is a screenshot depicting a hole selection screen.
Figure 5:
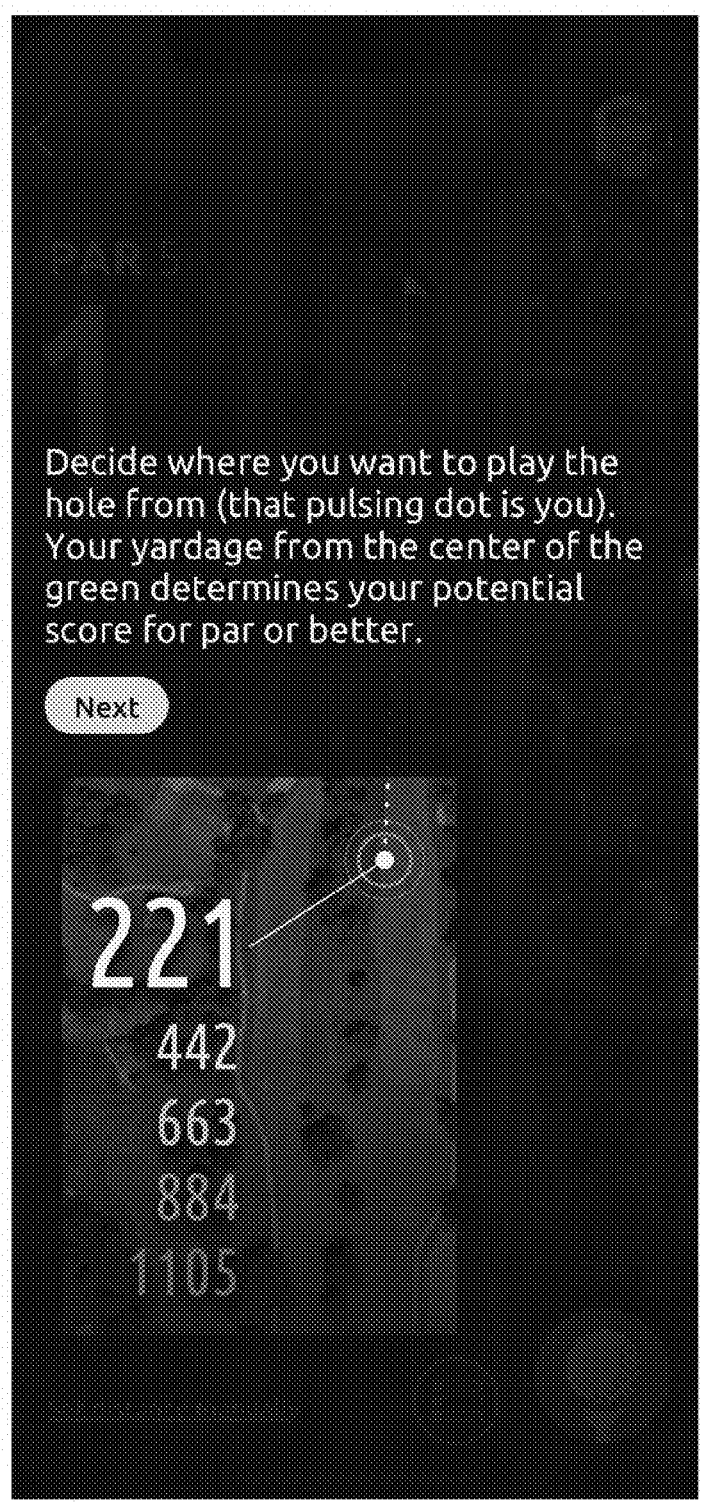
FIG. 5 is a screenshot depicting a starting location screen.
Figure 6:
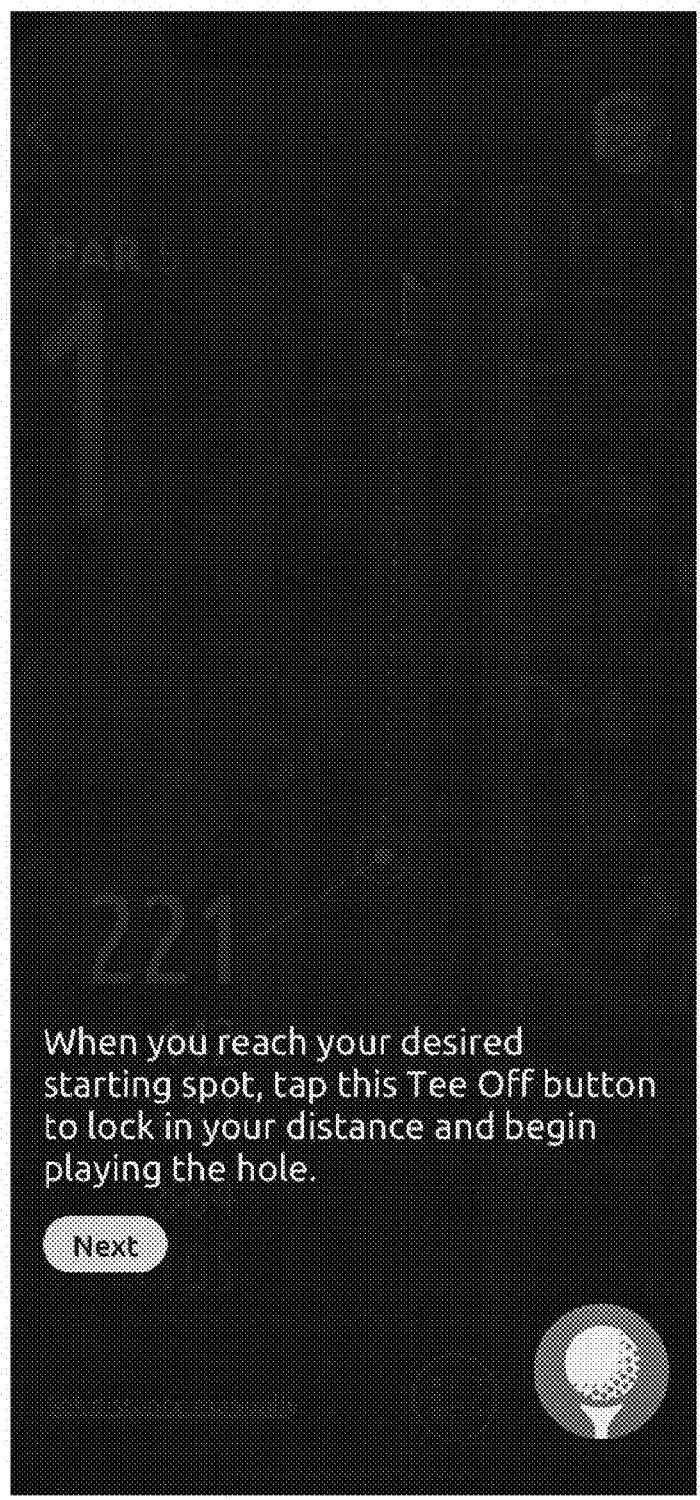
FIG. 6 is a screenshot depicting a starting location screen with a button to establish starting location.
Figure 7:
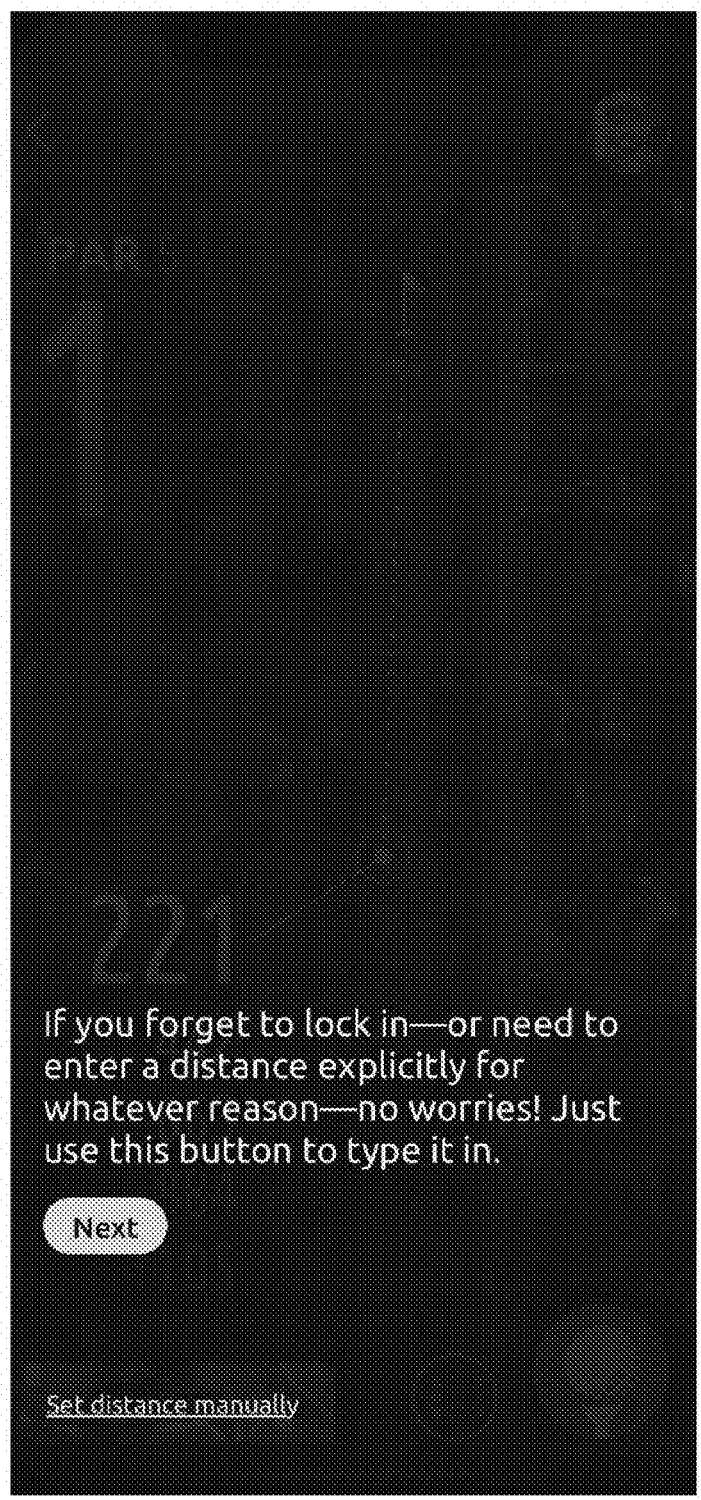
FIG. 7 is a screenshot depicting a starting location screen with instructions on manually entering a starting location.
Figure 8:
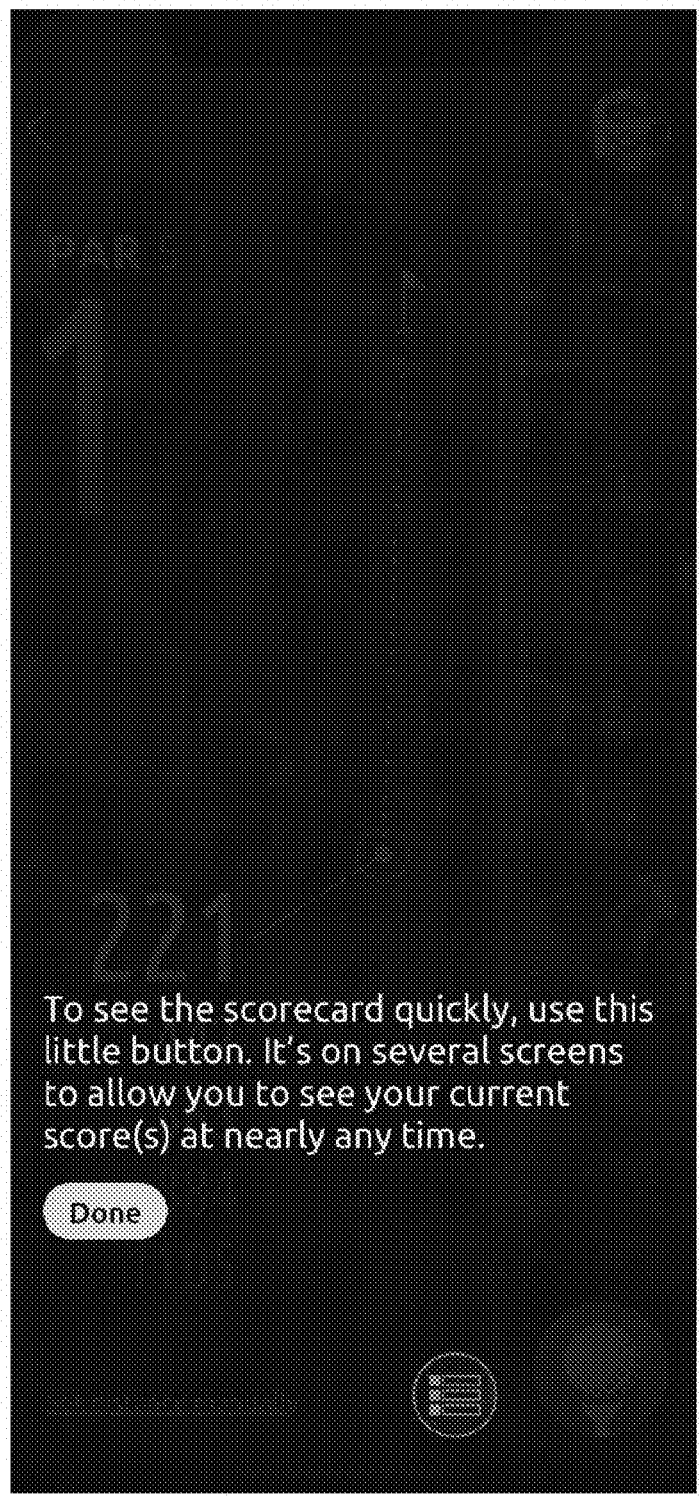
FIG. 8 is a screenshot depicting a starting location screen, showing a scorecard button.

In some embodiments, the walkthrough initiates by demonstrating to a user how to select a course, as shown in FIGS. 2 and 3. In some embodiments, a pre-populated list of courses is shown to the user. The user is then able to select a course from the pre-populated list. In some embodiments, the pre-populated list is stored in a database and retrieved as necessary by the software and displayed to a user. In some embodiments, each course is shown in an ordered list. In some embodiments, the courses are ordered by the relative location to the user. In such embodiments, the device's onboard GPS capabilities utilize the user's current location to populate results for nearby courses. In some embodiments, a user can search for nearby courses by name or other designation. After finding a desired course to be played, the user then selects the course.

In some embodiments, the walkthrough then moves to a starting hole selection screen being displayed on the device, such as in FIG. 3. In some embodiments, selection of the course loads into the software information related to the holes present for the selected golf course. In some embodiments, the user must enter or acknowledge a starting hole, thereby initiating a round. In some embodiments, the software defaults to a particular hole as the starting hole, such as hole one or hole 10 of the course. In some embodiments, the user can change a default or otherwise suggested starting hole, thereby facilitating starting at any hole of a course, such as during shot-gun start tournaments or other situations in which a player desires to play partial or unorthodox round of golf.

Referring to FIGS. 5-8, some embodiments of the walkthrough then displays a screen showing how to set a Points Baseline. In some embodiments, the screen identifies the location of the hole and the current location of the user, such as by displaying a pulsing dot. In some embodiments, the system utilizes the device's GPS capabilities to determine the position of the user relative to the Target Location of the hole. In some embodiments, the walkthrough includes instructions informing a user how their starting position will impact their potential score for the hole. For example, some embodiments utilize a prompt to inform a user that starting further from the Target Location will result in a higher potential score. In some embodiments, the score is displayed as yardage, which updates as the user moves relative to the Target Location. When a user reached their desired starting spot, the user is able to confirm, verify, or "lock-in" their starting location, thereby establishing the user's Tee-up Location for the hole. In some embodiments, confirming a starting location establishes a Points Baseline for the hole. In some embodiments, a user is able to manually enter a distance or starting location, thereby establishing a Points Baseline.

Figure 9:
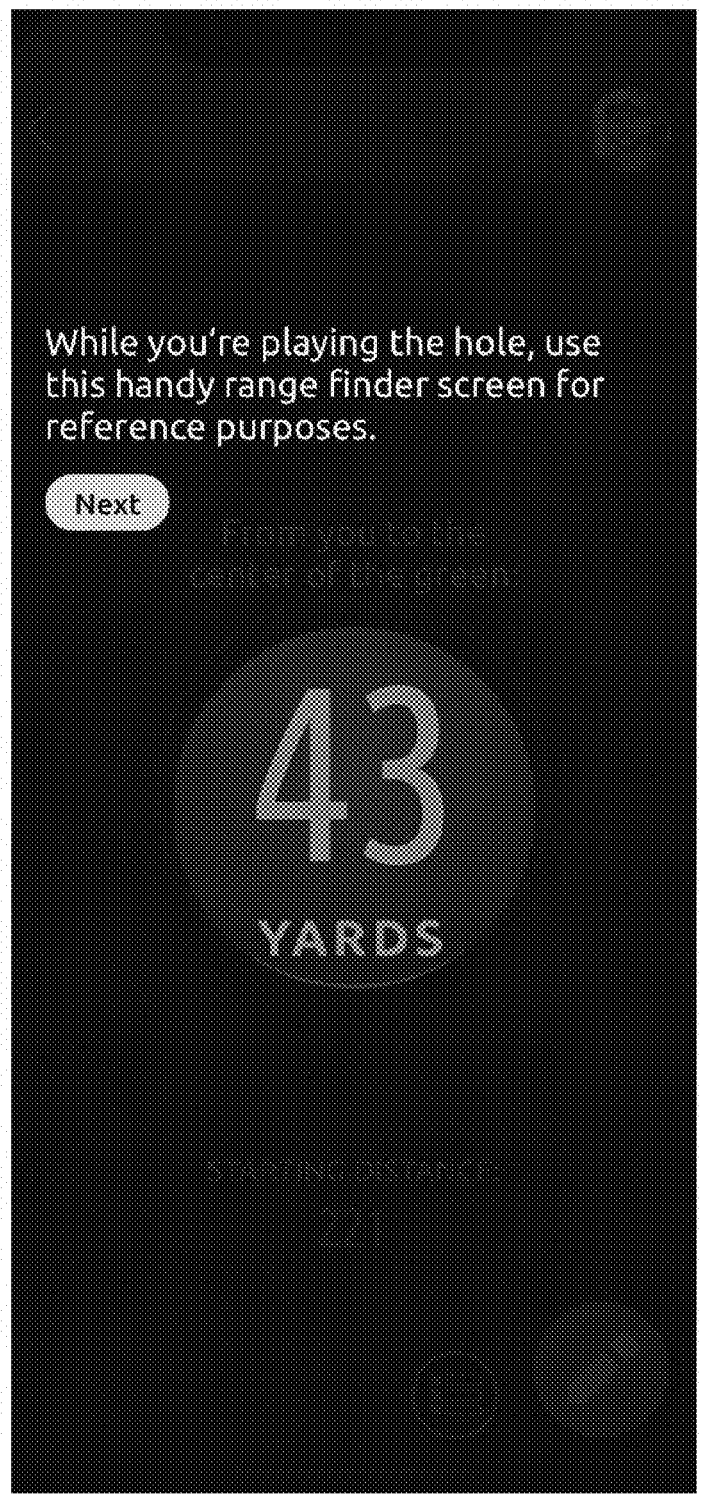
FIG. 9 is a screenshot depicting a rangefinder.
Figure 10:
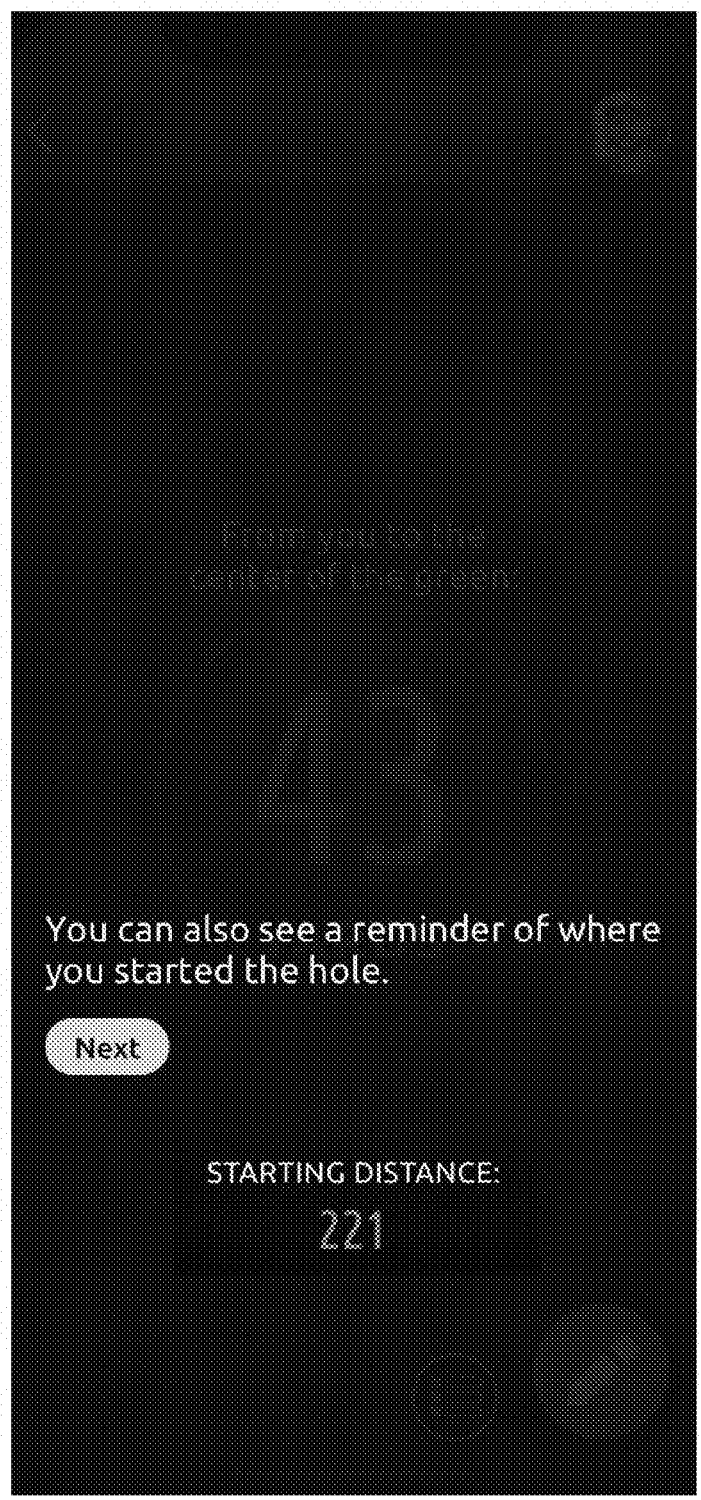
FIG. 10 is a screenshot depicting a reminder of starting distance.
Figure 11:
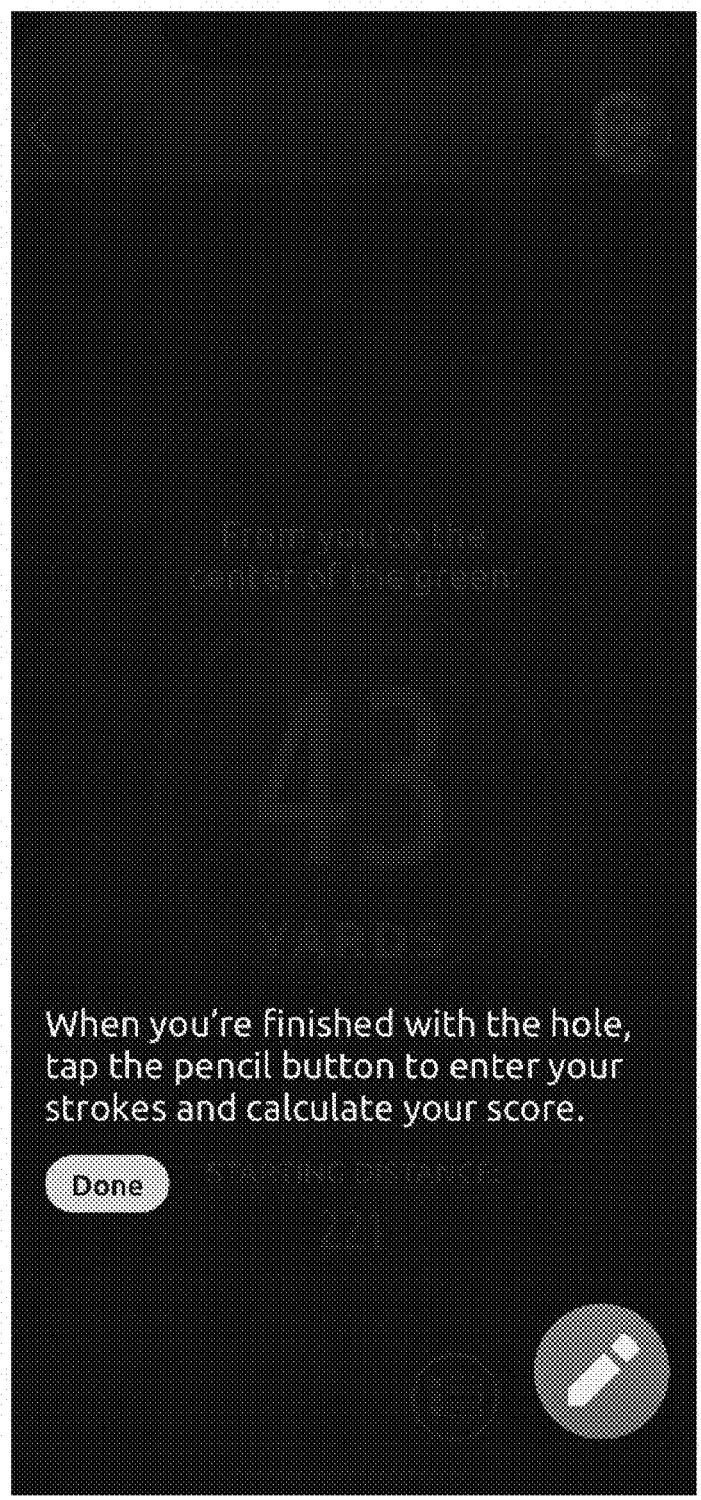
FIG. 11 is a screenshot depicting instruction on how to finish a hole.
Figure 12:
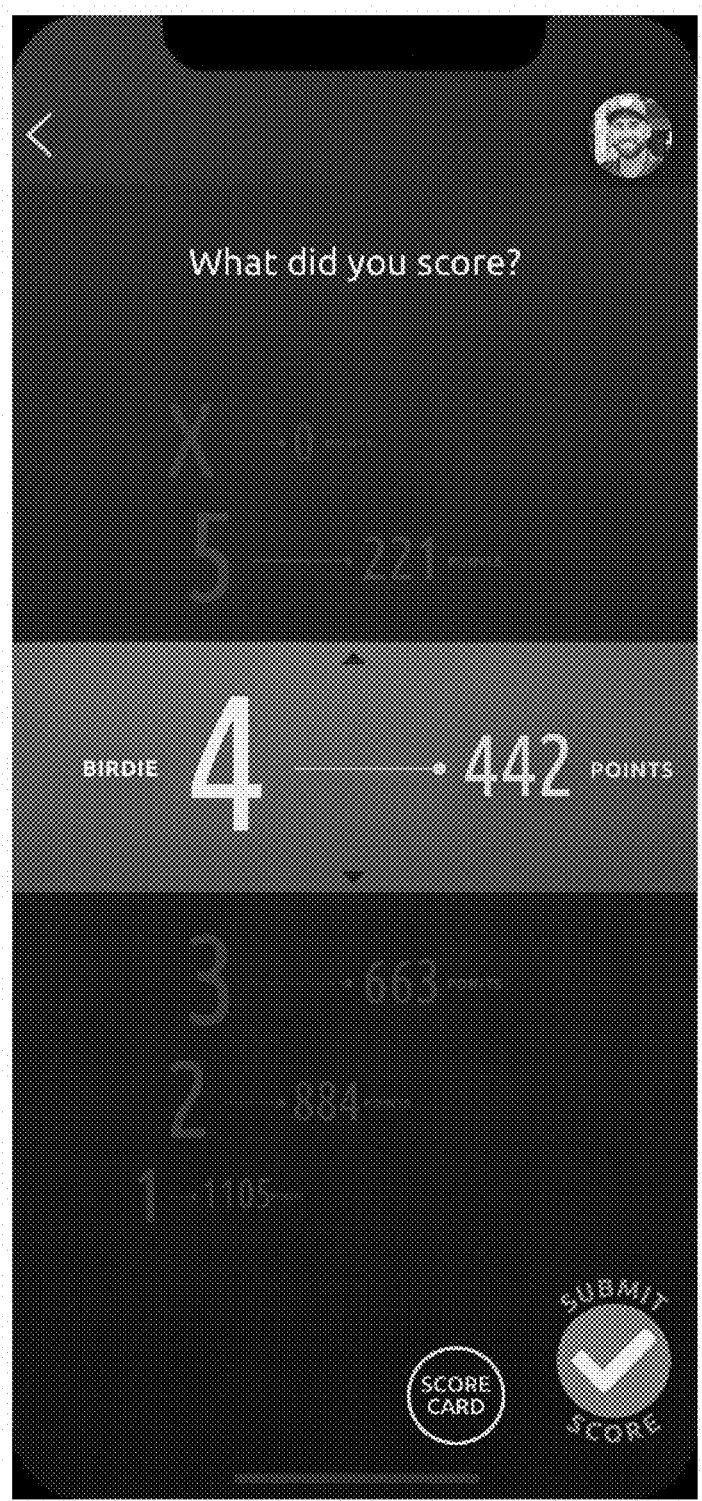
Figure 13:
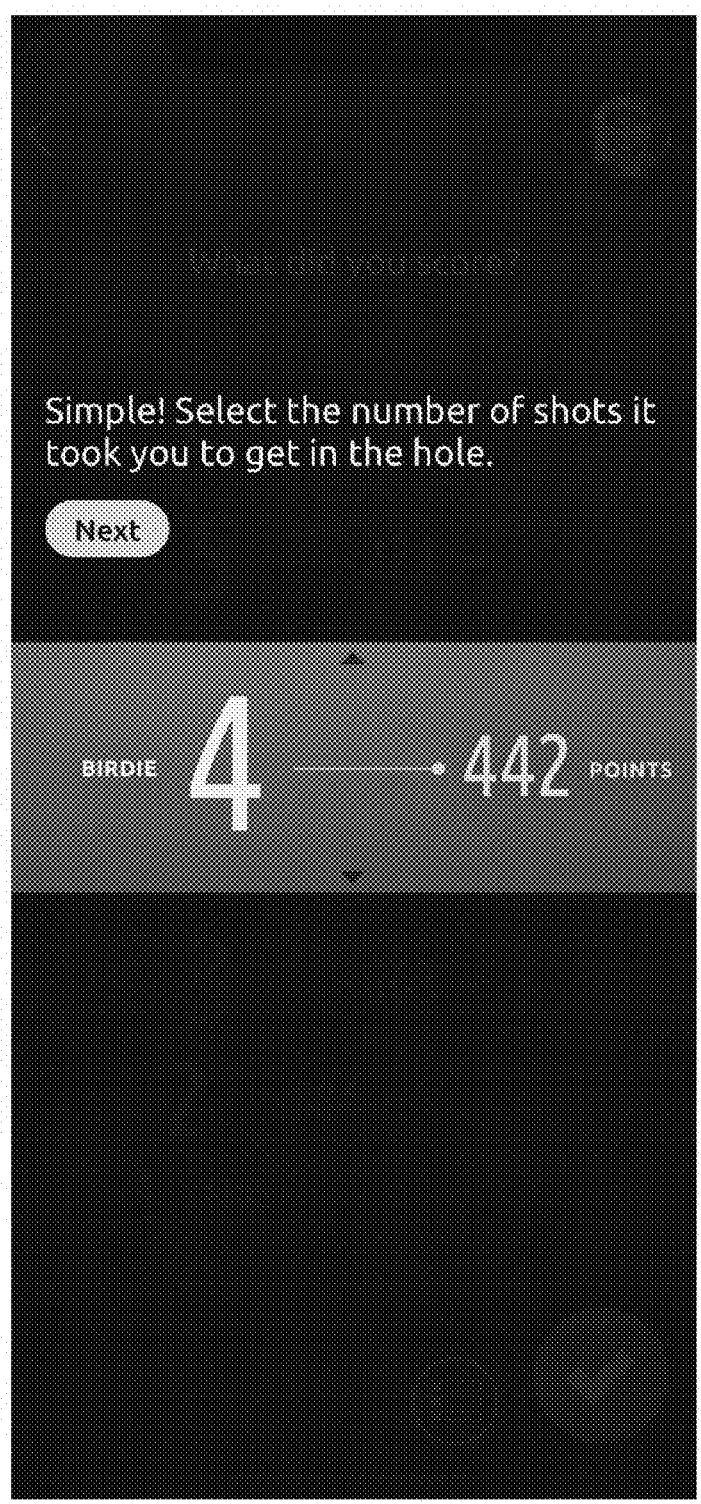
FIG. 13 is a screenshot depicting instructions on how to choose the correct option.
Figure 14:
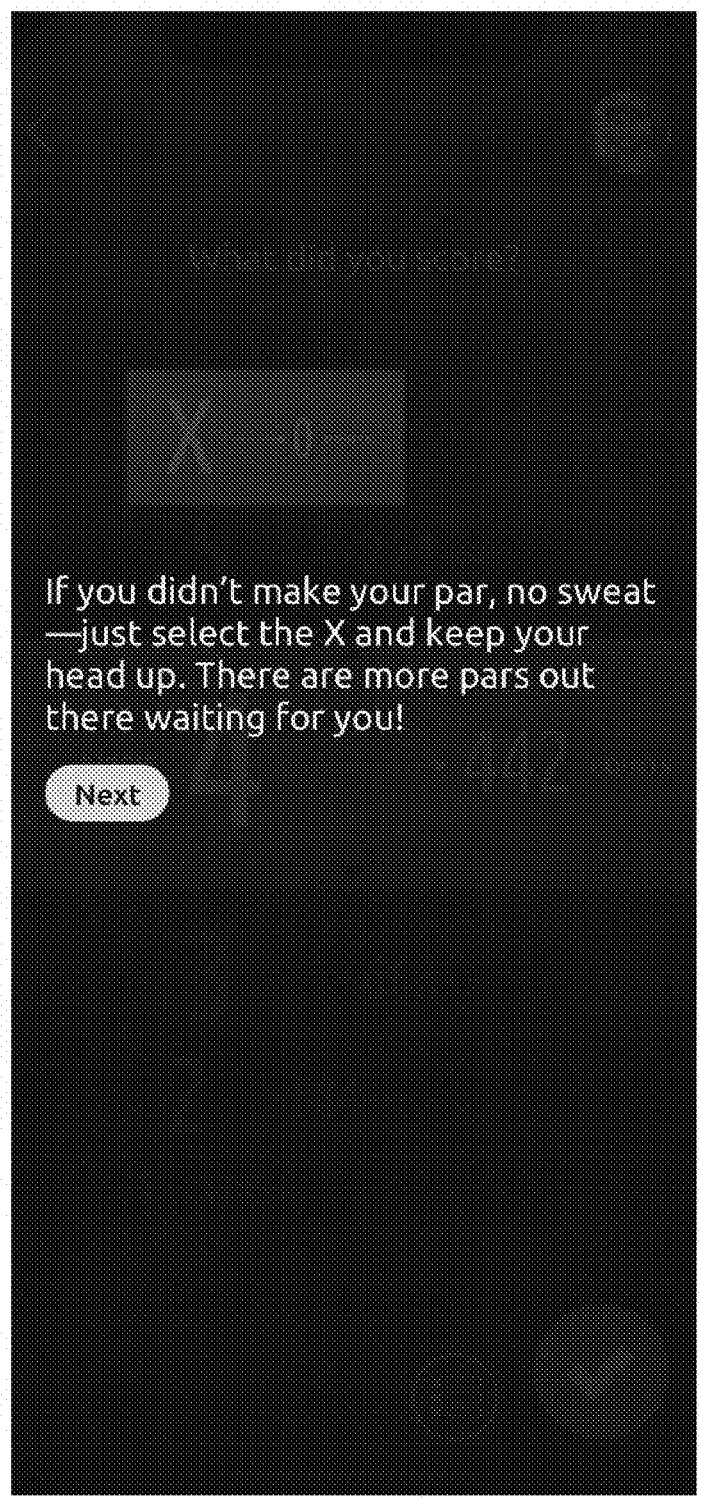
FIG. 14 is a screenshot depicting instructions on when to pick a certain option.
Figure 15:
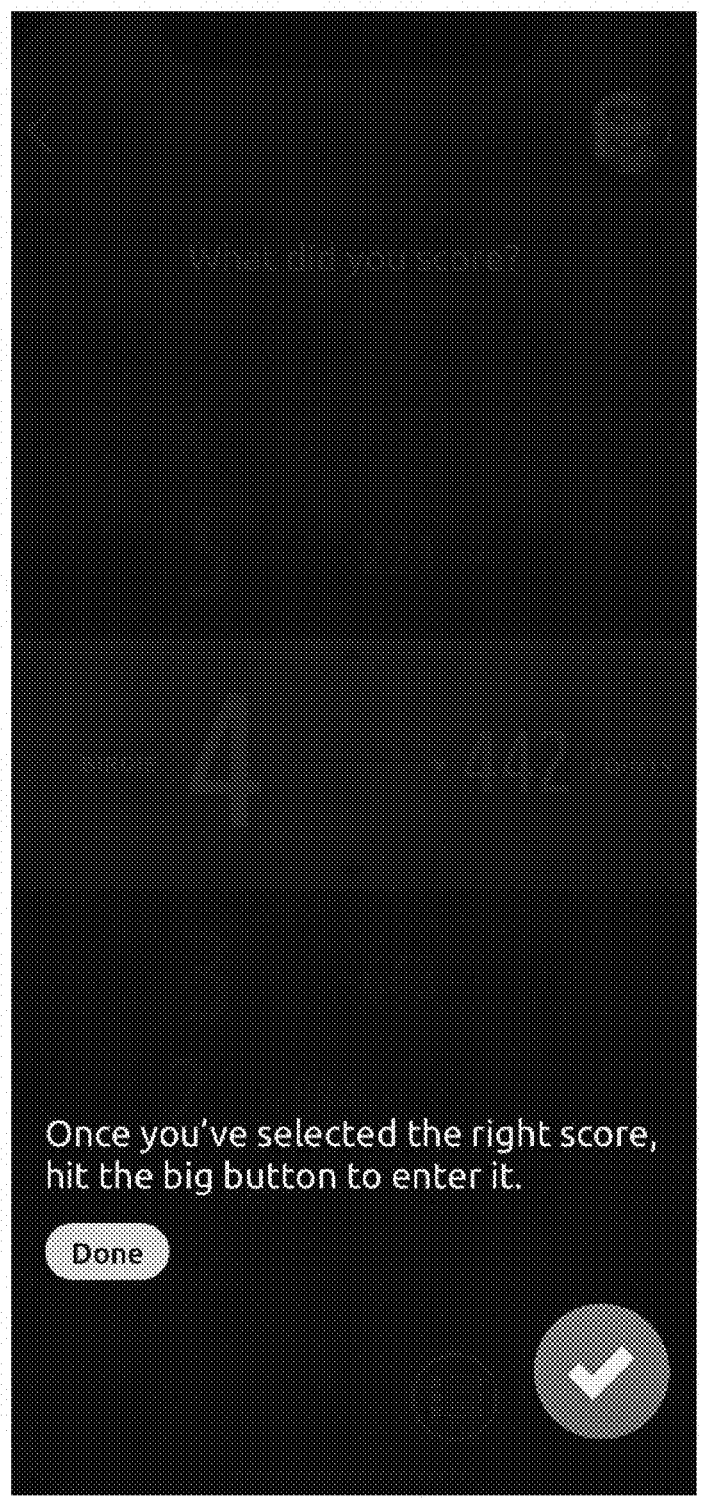
FIG. 15 is a screenshot depicting confirming a score.

Referring to FIGS. 9-11, in some embodiments, as the user is playing the hole, one or more present pieces of information are present. In some embodiments, a rangefinder is displayed. In some embodiments, the rangefinder utilizes the device's GPS capabilities to display the current distance the user is from the center of the green or from the hole. In some embodiments, the rangefinder updates as the user moves. In some embodiments, the Points Baseline is displayed on the screen. In some embodiments, a scorecard button is presented on the screen. In some embodiments, the user is able to select the scorecard button and have access to see the user's current scores.

Referring to FIGS. 12-15, in some embodiments, the walkthrough includes a screen showing a user how to enter a score. In some embodiments, a user enters the score manually. In some embodiments, upon selecting to enter a score, a user is presented with a screen for entering the score. In some embodiments, the screen contains a pre-populated list of options for the user to select. In some embodiments, the options indicate the total number of strokes the player took to complete the hole (Stroke Count) and the relative score the player will receive for completing the hole in that many strokes. In some embodiments, the point totals displayed in the options are based on the Stroke Baseline, Stroke Count, Points Baseline, and a Score Modifier. In some embodiments, the score displayed is a calculated Hole Score as described herein. In some embodiments, a zero score is included in the list, which indicates that either the Stroke Count exceeds a threshold value, such as the Stroke Baseline, or that the user did not complete the hole. It will be understood that not completing the hole encompasses a wide variety of situations, including failing to advance the ball to a cup within a certain number of strokes, whether those strokes are determined based on actual swings of the club, penalties associated with losing a ball to a hazard, or otherwise. It will be further understood that the Stroke Count accounts for actual strokes as well as penalty strokes, unless the players agree to different rules, such as allowing Mulligans or the like. In some embodiments, a user selects one of the available options, such as an option related to the Stroke Count. In some embodiments, upon selecting the score, the score is added to the player's total and the user is prompted to proceed to the next hole.

In some embodiments, the system tracks a user's location to determine when they have arrived at a second hole. In some embodiments, upon arriving at a second hole, the system notifies the user to establish a starting location for the second hole. In some embodiments, the software then conducts the same steps for a second hole as it did for the first and continues this routine until an entire round of golf is completed.

Figure 16:
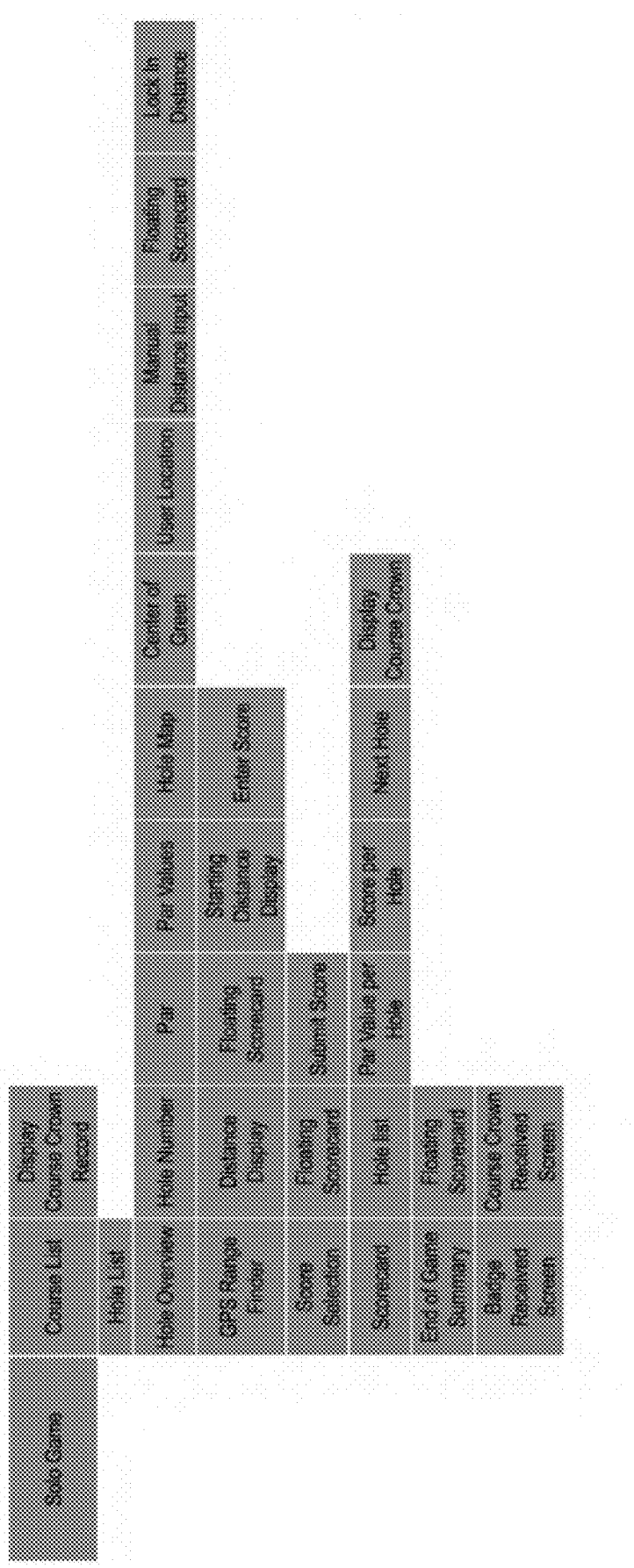
FIG. 16 is a diagram depicting a workflow for a solo game.

Referring to FIG. 16, some embodiments of the present invention includes a solo game routine or other feature for allowing a player to essentially compete against another player even when the other player is not currently playing the same course. In some embodiments, the solo game routine identifies one or more prior scores associated with a selected course, such as the current high score for the course. In some embodiments, the system allows users to elect a group from which the high score is determined, such as a group that contains all players and all time frames, a limited number of players (such as players who are within a certain age range, players who are members of certain clubs, players who are friends or otherwise acquainted with the user, or the like), or a limited number of time frames (such as scores within the last year, month, week, on the same day, etc.). In some embodiments, the system is configured to display information about one or more players, such as players within a selected group. In some embodiments, the displayed information includes an image of the player, badges achieved by the player (i.e. par badge for a hole, completion badge for a course, high score badge for a hole and/or course), records held by the player (i.e. highest score for a hole and/or course), or the like. In some embodiments, high score holders for a course and/or hole are indicated with a crown or other designation, such as by modifying an image of the high score holder by adding a crown. In some embodiments, the system provides a high score indication for any player having the high score on any course, regardless of whether the course is the course the user is currently playing. In some embodiments, high score indications are lost upon another player achieving an even higher score but a high score badge is retained, thereby designating the player as a prior record holder. In some embodiments, if a user has already completed a course, the user's high score for the course is displayed. In some embodiments, the user selects the course when the user is at the course. In other embodiments, the user pre-selects the course prior to arriving at the course. In some embodiments, the system includes a means of scheduling a tee time for the selected course. In some embodiments, the system sends reminders about the tee time to the user.

In some embodiments, after picking a course, the user picks a starting hole. the user then completes a series of holes associated with the course scoring each hole according the methods disclosed herein. Each hole's Hole Score is added at the end of the round to produce a total score for the user (the "Round Score"). In some embodiments, the system of the present invention provides a means of displaying information associated with the user's history for a given hole, or for the course, such as by displaying Hole Scores, Round Scores, Tee-up Locations, Stroke Counts, club selection, and the like. In some embodiments, the system utilizes the user history to determine optimized starting positions for a given hole, thereby assisting a user to improve upon prior Hole Scores and/or Round Scores.

Figure 17:
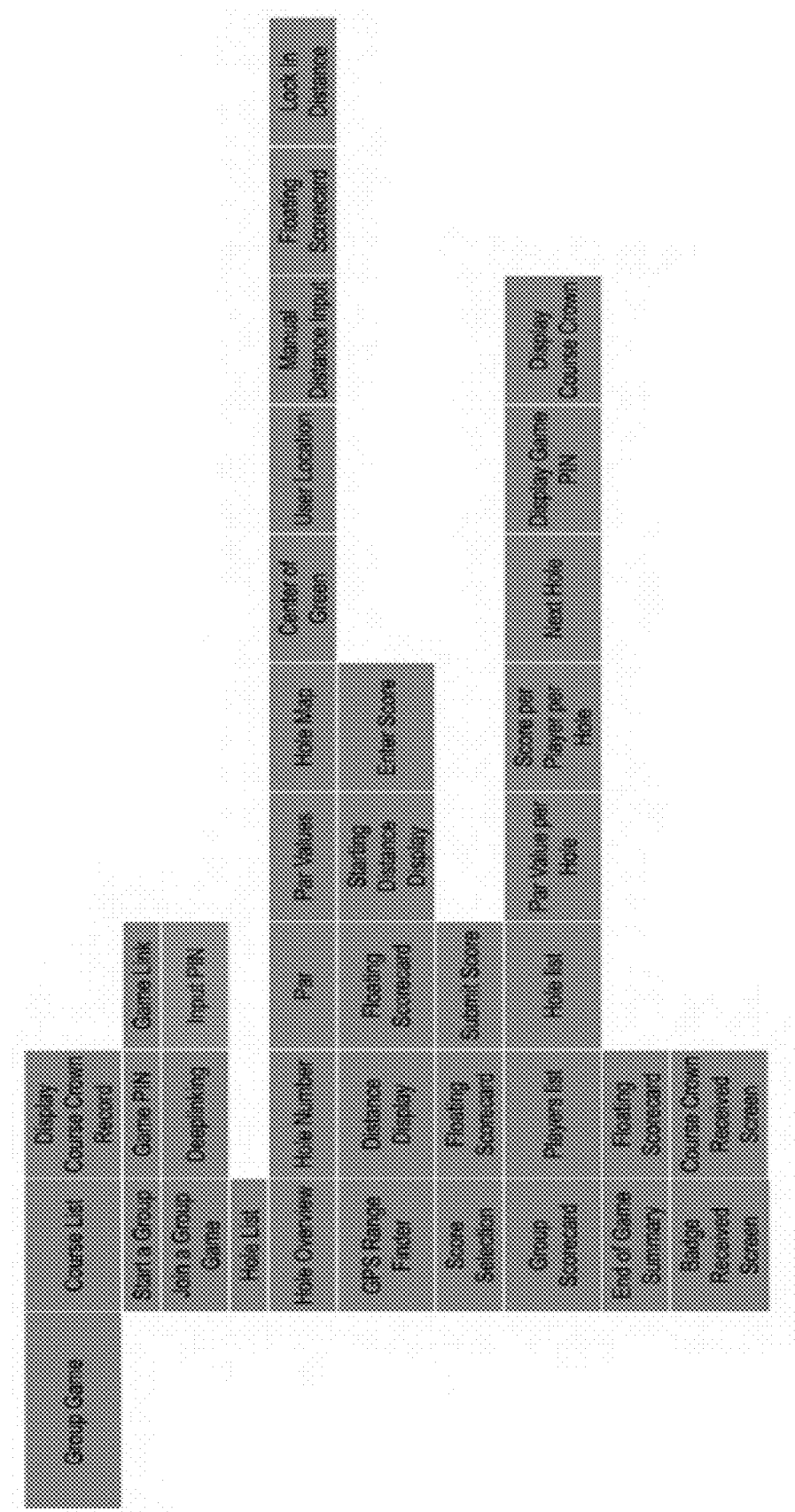
FIG. 17 is a diagram depicting a workflow for a group game.

Referring to FIG. 17, in some embodiments, the system includes scoring and managing games of golf for more than one user. In some embodiments, the system enables a first user to create a game lobby for multiple other users. In some embodiments, the first user selects a course as described herein and subsequently selects a prompt to start a group. The user is then prompted to enter a game pin, which is some embodiments is a numeric code. The user is then provided a link which can be sent to the other users for which the game lobby is being created. By selecting the link, the other users are added to the game lobby. In some embodiments, the user is first prompted to enter the game pin prior to be entered into the game lobby. In some embodiments, upon finalizing a group of users for a game, the game proceeds as described herein for a single user, with all users completing the required steps to score a given hole of golf. In some embodiments, each user controls a device and enters their own information into the device, which is then shared with the other devices. In some embodiments, the group game is managed on a single device, with one user entering the scoring details for all group members.

Figure 18:
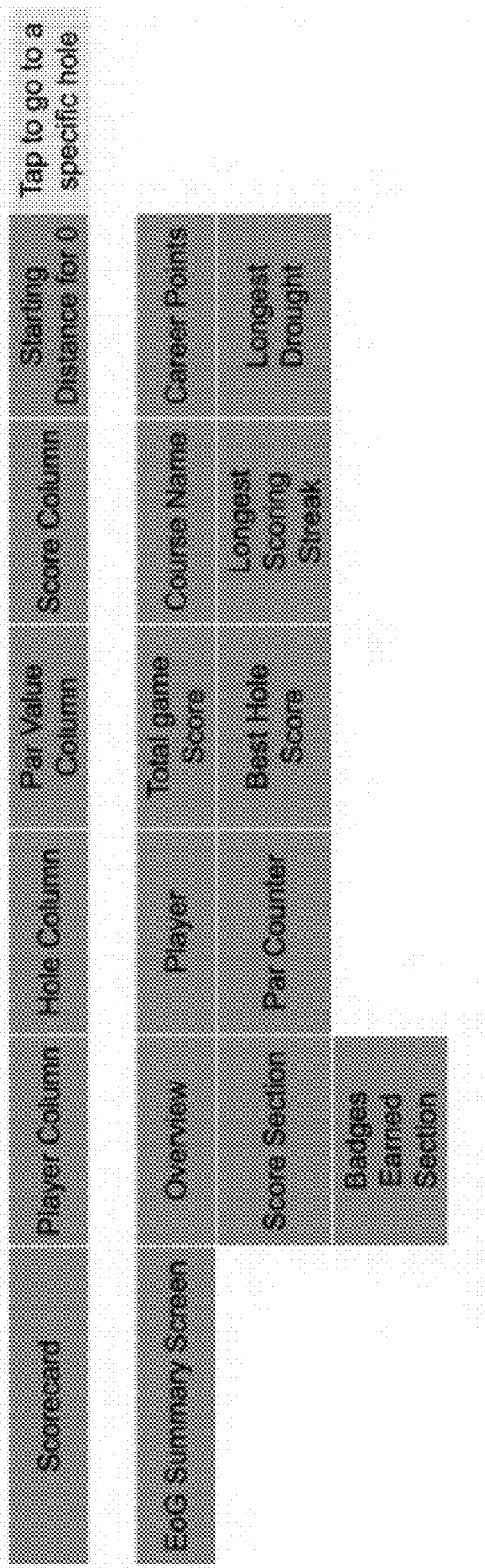
FIG. 18 is a diagram depicting a workflow for a scorecard and an end of game summary.

Referring to FIG. 18, in some embodiments, the present invention utilizes a scorecard. In some embodiments, the scorecard displays player and course details for a given round of golf. In some embodiments, the scorecard is accessible during and after a round of golf. The scorecard contains information for all players in the round for group games, while displaying information for a single player for a solo game. In some embodiments, the scorecard displays various forms of information related to each hole in a round, including but not limited to at least one of: player name, hole numbers, par value, Stroke Baseline, score, total score, Score Baseline, Player Strokes, Performance Factor, starting location for a given hole, and the like. In some embodiments, a user can select a specific hole in the scorecard to see more detailed information for that hole. In some embodiments, the scorecard is saved in a database associated with the user or users who participated in the game associated with the scorecard.

In some embodiments, the present invention includes a summary screen at the end of a round of golf. In some embodiments, the summary screen is displayed on a screen of the device. In some embodiments, the summary screen includes information associated with the round of golf which proceeded. In some embodiments, the overview screen includes multiple pieces of information, such as, but not limited to, overview, players, total game score, course name, holes played, total career points for each user, scoring information, statistics information, best hole score, longest scoring streak, longest drought, awards earned, and the like.

In some embodiments, a user performance is tracked in one or more database. In some embodiments, the database is accessible by the user device to display user performance. In some embodiments, user performance information includes stats for a user, said stats including but not limited to, total points scored, 18-hole average, total rounds played, highest single round score, par 5 average, highest single hole par 5, par 4 average, highest single hole par 4, par 3 average, highest single hole par 3, game logs including rounds, dates played, scorecards, points, and the like. In some embodiments, the user's performance is utilized to generate a handicap. In some embodiments, the handicap is a point total that the user adds to the Hole Score for a given hole. In some embodiments, the handicap is a point total that the user adds to their score for a total round. In some embodiments, the handicap is generated by comparing the user's scoring history against the scoring history data of all users.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A system for scoring a hole of golf, the system comprising:
   a first mobile device for displaying information about a hole, the displayed information comprising a stroke baseline for the hole; and
   an application loaded onto the first mobile device, the application comprising a first input screen for inputting a tee-up location for a first player, the application comprising a baseline algorithm for determining a points baseline for the first player based on the location of the tee-up location for the first player,
   wherein the application comprises a second input screen for inputting a number of strokes required by the first player to complete a first hole, the application comprising a performance algorithm that is configured to determine a performance factor for the first player, the performance factor being determined by comparing the stroke count for the first player with the stroke baseline of the hole,
   wherein the application comprises an output screen for displaying a hole score for the first player, the hole score for the first player being determined by multiplying the points baseline for the first player by the performance factor for the first player,
   wherein the points baseline for the first player is determined by comparing the tee-up location for the first player with a target location for the hole, wherein the tee-up location for the first player is the location from which the first player hits their tee shot, and wherein the target location for the hole is a location positioned on a putting green of the hole,
   wherein the points baseline for the first player is equal to the total distance in yards between the tee-up location for the first player and the target location for the hole,
   wherein the stroke baseline for the hole is determined by setting the stroke baseline equal to a standard par value for the hole, and
   wherein the performance factor for the first player is zero if the stroke count of the first player exceeds the stroke baseline of the hole.

2. A system for scoring a hole of golf, the system comprising:
   a first mobile device for displaying information about a hole, the displayed information comprising a stroke baseline for the hole; and
   an application loaded onto the first mobile device, the application comprising a first input screen for inputting a tee-up location for a first player, the application comprising a baseline algorithm for determining a points baseline for the first player based on the location of the tee-up location for the first player,
   wherein the application comprises a second input screen for inputting a number of strokes required by the first player to complete a first hole, the application comprising a performance algorithm that is configured to determine a performance factor for the first player, the performance factor being determined by comparing the stroke count for the first player with the stroke baseline of the hole,
   wherein the application comprises an output screen for displaying a hole score for the first player, the hole score for the first player being determined by multiplying the points baseline for the first player by the performance factor for the first player,
   wherein the points baseline for the first player is determined by comparing the tee-up location for the first player with a target location for the hole, wherein the tee-up location for the first player is the location from which the first player hits their tee shot, and wherein the target location for the hole is a location positioned on a putting green of the hole, and
   wherein the performance factor for the hole is zero if the stroke count of the first player exceeds the stroke baseline of the hole.

3. The system of claim 2, wherein the stroke baseline for the hole is equal to one plus the difference between the stroke count of the first player and the stroke baseline of the hole when the stroke count of the first player is less than or equal to the stroke baseline.

4. A system for scoring a hole of golf, the system comprising:
   a first mobile device for displaying information about a hole, the displayed information comprising a stroke baseline for the hole;
   an application loaded onto the first mobile device, the application comprising a first input screen for inputting a tee-up location for a first player, the application comprising a baseline algorithm for determining a points baseline for the first player based on the location of the tee-up location for the first player; and
   second mobile device,
   wherein the application comprises a second input screen for inputting a number of strokes required by the first player to complete a first hole, the application comprising a performance algorithm that is configured to determine a performance factor for the first player, the performance factor being determined by comparing the stroke count for the first player with the stroke baseline of the hole,
   wherein the application comprises an output screen for displaying a hole score for the first player, the hole score for the first player being determined by multiplying the points baseline for the first player by the performance factor for the first player,
   wherein the points baseline for the first player is determined by comparing the tee-up location for the first player with a target location for the hole, wherein the tee-up location for the first player is the location from which the first player hits their tee shot, and wherein the target location for the hole is a location positioned on a putting green of the hole, and
   wherein a calculated score for the hole is the point total multiplied by one plus the difference between the player strokes and the stroke baseline when the player strokes is less than or equal to the stroke baseline.

5. A system for scoring a hole of golf, the system comprising:
   a first mobile device for displaying information about a hole, the displayed information comprising a stroke baseline for the hole; and
   an application loaded onto the first mobile device, the application comprising a first input screen for inputting a tee-up location for a first player, the application comprising a baseline algorithm for determining a points baseline for the first player based on the location of the tee-up location for the first player,
   wherein the application comprises a second input screen for inputting a number of strokes required by the first player to complete a first hole, the application comprising a performance algorithm that is configured to determine a performance factor for the first player, the performance factor being determined by comparing the stroke count for the first player with the stroke baseline of the hole, wherein the application comprises an output screen for displaying a hole score for the first player, the hole score for the first player being determined by multiplying the points baseline for the first player by the performance factor for the first player, and wherein the performance factor for the hole is zero if the stroke count of the first player exceeds the stroke baseline of the hole.

6. The system of claim 5, wherein the stroke baseline for the hole is equal to one plus the difference between the stroke count of the first player and the stroke baseline of the hole when the stroke count of the first player is less than or equal to the stroke baseline.

7. A system for scoring a hole of golf, the system comprising:
- a first mobile device for displaying information about a hole, the displayed information comprising a stroke baseline for the hole;
- an application loaded onto the first mobile device, the application comprising a first input screen for inputting a tee-up location for a first player, the application comprising a baseline algorithm for determining a points baseline for the first player based on the location of the tee-up location for the first player; and
- a second mobile device, wherein the application comprises a second input screen for inputting a number of strokes required by the first player to complete a first hole, the application comprising a performance algorithm that is configured to determine a performance factor for the first player, the performance factor being determined by comparing the stroke count for the first player with the stroke baseline of the hole, wherein the application comprises an output screen for displaying a hole score for the first player, the hole score for the first player being determined by multiplying the points baseline for the first player by the performance factor for the first player, and wherein a calculated score for the hole is the point total multiplied by one plus the difference between the player strokes and the stroke baseline when the player strokes is less than or equal to the stroke baseline.

* * * * *

UNITED STATES PATENT AND TRADEMARK OFFICE
CERTIFICATE OF CORRECTION

PATENT NO. : 11,554,308 B2
APPLICATION NO. : 17/077799
DATED : January 17, 2023
INVENTOR(S) : Ebert et al.

Page 1 of 1

It is certified that error appears in the above-identified patent and that said Letters Patent is hereby corrected as shown below:

In the Specification

In Column 16, Line 53, delete "with in" and insert -- within --, therefor.

In the Claims

In Column 18, Claim 4, Line 29, delete "second" and insert -- a second --, therefor.

Signed and Sealed this
Fourth Day of April, 2023

*Katherine Kelly Vidal*

Katherine Kelly Vidal
*Director of the United States Patent and Trademark Office*